(12) United States Patent
Ishii et al.

(10) Patent No.: US 6,940,801 B1
(45) Date of Patent: Sep. 6, 2005

(54) OPTICAL RECORDING MEDIUM, OPTICAL RECORDING AND REPRODUCING METHOD AND APPARATUS

(75) Inventors: Tsutomu Ishii, Nakai-machi (JP); Katsunori Kawano, Nakai-machi (JP); Kazuo Baba, Nakai-machi (JP); Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/181,809

(22) Filed: Oct. 29, 1998

(30) Foreign Application Priority Data

Nov. 10, 1997 (JP) .............................................. 9-323842

(51) Int. Cl.⁷ ................................................. G11B 7/00
(52) U.S. Cl. ............................. 369/112.01; 369/110.01; 369/110.04; 369/112.16; 365/120; 365/121; 430/1; 430/19; 430/270.15; 430/645
(58) Field of Search ....................... 369/112.01, 110.01, 369/110.04, 112.16, 103, 272, 112, 288, 13.29, 101, 100, 59.11; 365/120, 121, 113, 119, 127; 430/1, 19, 270.15, 945, 18, 20, 270.14; 428/1.5, 1.1, 195; 156/273.1, 275.1, 292; 349/86, 124, 165, 132, 133; 359/900

(56) References Cited

U.S. PATENT DOCUMENTS

| | | | | |
|---|---|---|---|---|
| 4,551,819 A | * | 11/1985 | Michl et al. .................. 365/120 |
| 4,847,823 A | * | 7/1989 | Lindow et al. ........ 369/110.01 |
| 4,864,537 A | * | 9/1989 | Michl et al. .................. 365/120 |
| 4,925,708 A | * | 5/1990 | Waters et al. .................. 428/1.5 |
| 5,023,859 A | * | 6/1991 | Eich et al. .................... 369/101 |
| 5,024,784 A | * | 6/1991 | Eich et al. .................... 369/272 |
| 5,032,009 A | * | 7/1991 | Gibbons et al. ............. 349/124 |
| 5,251,197 A | * | 10/1993 | Leube et al. ........... 369/110.01 |
| 5,255,262 A | * | 10/1993 | Best et al. .................. 369/275.1 |
| 5,296,321 A | * | 3/1994 | Kawanishi et al. ........... 430/20 |
| 5,316,900 A | * | 5/1994 | Jsujioka et al. .............. 430/495 |
| 5,384,221 A | * | 1/1995 | Savant et al. ................... 430/19 |
| 5,447,778 A | * | 9/1995 | Ohtake et al. ............... 428/195 |
| 5,488,597 A | * | 1/1996 | Chen et al. .................. 369/283 |
| 5,529,864 A | * | 6/1996 | Tachibana et al. ............. 430/20 |
| 5,589,237 A | * | 12/1996 | Akashi et al. ................ 428/1.1 |
| 5,644,416 A | * | 7/1997 | Morikawa et al. ............. 349/86 |

FOREIGN PATENT DOCUMENTS

| | | |
|---|---|---|
| JP | A-64-17248 | 1/1989 |
| JP | 02-080125 | 3/1990 |
| JP | 02-280116 | 11/1990 |
| JP | 03-149660 | 6/1991 |
| JP | A-4-38720 | 2/1992 |
| JP | 04-030192 | 2/1992 |

OTHER PUBLICATIONS

Kutanov A. et al. "Conjugate Image Plane Correlator with Holographic Disk Memory", *Optical Review*, vol. 3, No. 4 (1996) pp. 258–263.

Hong J.H. et al. "Volume holographic memory systems: techniques and architectures", *Optical Engineering*, vol. 34, No. 8 (Aug. 1995) pp. 2193–2203.

Barbastathis G. et al. "Holographic 3D disks using shift multiplexing", *SPIE*, vol. 2514 pp. 355–362.

* cited by examiner

*Primary Examiner*—Tan Dinh
*Assistant Examiner*—Kim-Kwok Chu
(74) *Attorney, Agent, or Firm*—Oliff & Berridge, PLC

(57) ABSTRACT

An optical recording medium, an optical recording and reproducing method, and an apparatus that can record and reproduce multilevel information at a high density and with a high S/N ratio. Recording light emitted from a light source is collimated by a collimation lens and introduced into a polarization rotary device. Recording light transmitted by the polarization rotary device is focused by an objective lens onto an optical recording medium. In response, a photo-induced birefringence is recorded on the optical recording medium. Multilevel recording is performed by controlling a voltage applied to the polarization rotary device to change a polarization angle θ of recording light. Reproduction is performed by detecting light reflected from the optical recording medium with an analyzer and a detector.

57 Claims, 17 Drawing Sheets

OPTICAL RECORDING MEDIUM, OPTICAL RECORDING AND REPRODUCING METHOD AND APPARATUS

BACKGROUND OF THE INVENTION

1. Field of Invention

The present invention relates to an optical recording medium, an optical recording and reproducing method, and an apparatus that realizes high density and high speed in data recording and data transferring, respectively.

2. Description of Related Art

In optical recording, rewritable optical disk apparatus such as a phase-change type and a magneto-optical disk type have heretofore been widely used for high-density recording. Although these optical disk apparatus are higher than ordinary magnetic disk apparatus in recording density by more than one order of magnitude, such recording density is not yet useful for recording digital image data. In order to further increase a recording density, it is necessary to reduce a distance between adjacent tracks or adjacent bits by reducing a diameter of a beam spot.

A DVD-ROM that uses such optical recording technology is commercially available. The DVD-ROM is a 12-cm disk which is able to store 4.7 gigabytes of data on one side. A rewritable DVD-RAM is able to record 5.2 gigabytes of data with a high density on both sides of a 12-cm disk and uses phase-change recording. This disk is able to write and read information and has a storage capacity that is more than 7 times that of a read-only CD-ROM and that is equivalent to more than 3600 floppy disks. As described above, technology for increasing the recording density of optical disks is being advanced every year. However, on the other hand, since the above-mentioned optical disk records data within the surface, the optical disk is limited by diffraction so that a recording density of approximately 5 gigabits/inch$^2$ is the physical limit of high-density optical recording.

Accordingly, in order to realize the higher density/speed of data recording and transferring, a method of recording multilevel data in one recording pit is proposed. Such technologies are described in Japanese Published Unexamined Patent Application No. Sho 64-17248 and Japanese Published Unexamined Patent Application No. Hei 4-38720. A fundamental principle of magneto-optical recording is to read out a change in polarization angle of reflected light caused by a magneto-optical Kerr effect in the recording area. However, although there are provided various devices, the change of the polarization angle obtained by the Kerr effect is very small, e.g. about 1 degree. As a result, it is difficult to provide multilevel data within this small polarization angle change from a Signal-to-Noise ratio (S/N) standpoint. Therefore, there are made various attempts to widen the dynamic range of the signal.

The technology described in Japanese Published Unexamined Patent Application No. Sho 64-17248 uses a multilevel recording medium formed of multiple layers of recording films having different Curie temperatures. Also, the technology described in Japanese Published Unexamined Patent Application No. Hei 4-38720 uses elliptic recording pits to record and reproduce multilevel data on and from the optical disk and provides multilevel data by changing an inclination amount of elliptic recording pits.

However, according to the typical manufacturing process for making a multilayer recording film, the number of the layers that can be laminated to provide the multilayer structure is limited, and the dynamic range cannot be widened. Therefore, much of the multilevel-modulation cannot be obtained. Also, there is then the problem that, when the film thickness of the recorded portion increases as the number of the layers in the multilayer increases, a recording density in the surface direction is lowered due to the diffusion of heat into the disk surface. On the other hand, according to the method in which the recording pits are formed as elliptic recording pits, in order to keep a recording density similar to that of the conventional method, it is unavoidable that the area of the recording pits is decreased as compared with the ordinary case because the recording pits are formed in an elliptical shape. As a result, it is not possible to avoid the signal intensity from being lowered in the single substance of the recording pit so that a deterioration in the S/N ratio occurs. Further, with respect to signal detection, a difference produced between the reproduced light patterns due to the inclination angle of the pits is detected by a plurality of detectors. If the amount of multilevel information is increased, then a difference between the patterns of each respective gradation becomes considerably small so that the signal at each detector becomes very small. Therefore, if information is stored as multilevel information having a large number of different gradation levels, a lack of detection accuracy occurs. Hence, multilevel information having a large number of gradation levels cannot be obtained.

SUMMARY OF THE INVENTION

The present invention provides an optical recording medium and optical recording and reproducing method and apparatus in which multilevel data may be recorded and reproduced at a high density and with a high S/N ratio.

An optical recording medium according to the present invention is manufactured so as to include an optical recording layer of at least one layer made of an optical recording material that changes a state of photo-induced birefringence in response to recording light. Portions of the optical recording layer that change a state of photo-induced birefringence function as an optical element that adjusts the polarization angle of incident reproducing light by an amount larger than a difference between a polarization angle of recording light used to form the optical element and a polarization angle of the reproducing light before the reproducing light is acted on by the optical element.

In one aspect of the invention, portions of the optical recording layer that change a state of photo-induce birefringence substantially functions optically as a half-wave plate or a quarter-wave plate.

In one aspect of the invention, the optical recording layer comprises a polymer or a liquid crystal polymer having a photo-isomerized group in a side chain.

In an optical recording method according to the present invention, a birefringence is induced by directing linearly-polarized recording light to an optical recording medium to thereby form a half-wave plate or a quarter-wave plate having a polarization plane direction of the incident light. By rotating an azimuth (referred to as a polarization angle) of a polarization plane of the recording light, the azimuth of the half-wave plate or the quarter-wave plate is rotated. Accordingly, by making the polarization angle of the recording light multilevel, it is possible to perform multilevel recording.

In an optical reproducing method according to the present invention, reproducing light of an arbitrary polarization angle is incident on a half-wave plate or a quarter-wave plate recorded in an optical recording medium, and a change of a polarization angle of transmitted or reflected light compared to the incident light is detected. The change of this polarization angle corresponds to twice the angle difference between the polarization angle of reproducing light and the polarization angle of recording light. Accordingly, it is possible to reproduce multilevel recorded data by the detection of this angle.

An optical recording apparatus according to the present invention includes a light source for generating coherent recording light, a spatial modulator for rotating a polarization of light from the light source in response to recording information, and a focusing optical system for directing recording light on the optical recording medium. Thus, the azimuth of a half-wave plate or a quarter-wave plate within the optical recording medium is multilevel-modulated and recorded. As the spatial modulator, a polarization rotary device such as a liquid-crystal bulb can be used.

An optical reproducing apparatus according to the present invention includes a reproducing light optical system for directing reproducing light on an optical recording medium in which the azimuth of a half-wave plate or quarter-wave plate within the optical recording medium is multilevel-modulated and recorded by recording light. An analyzing unit detects a polarization angle of reproducing light from the optical recording medium, thereby reproducing recording information which was multilevel-modulated and recorded.

According to the present invention, a high-density recording may be made by multilevel-modulating the polarization angle of the recording light. In addition, upon reproduction, the detected polarization angle is twice the angle of recording light so that a stable S/N ratio may be obtained.

BRIEF DESCRIPTION OF THE DRAWINGS

FIGS. 1(A) to 1 (I) are diagrams showing polarized states of light, respectively;

DETAILED DESCRIPTION OF PREFERRED EMBODIMENTS

Initially, a principle of a polarization angle multilevel recording according to the present invention will be described. A method of rotating a polarization angle of linearly-polarized light at an arbitrary angle will be effected as follows. Light is a kind of electromagnetic wave and may be expressed by Maxwell's equations. If a z-axis (light traveling direction) is fixed, then the electromagnetic field E of light may be expressed by the following equation (1):

$$E(t)=\hat{x}E_x \cos(\omega t-\phi_x)+\hat{y}E_y \cos(\omega t-\phi_y) \tag{1}$$

Here, $\phi_x$ and $\phi_y$ represent the initial phases relative to the x axis and y axis respectively. The tip end of this electric field vector E draws various orbits based on a value of a phase difference $(\phi_x-\phi_y)$ between the x axis and the y axis. FIGS. 1(A) to 1(I) schematically show various orbits drawn by the tip end of the electric field E, and illustrate light polarized states obtained when the phase difference $(\phi_x-\phi_y)$ between the x axis and the y axis is changed.

Figure 1:
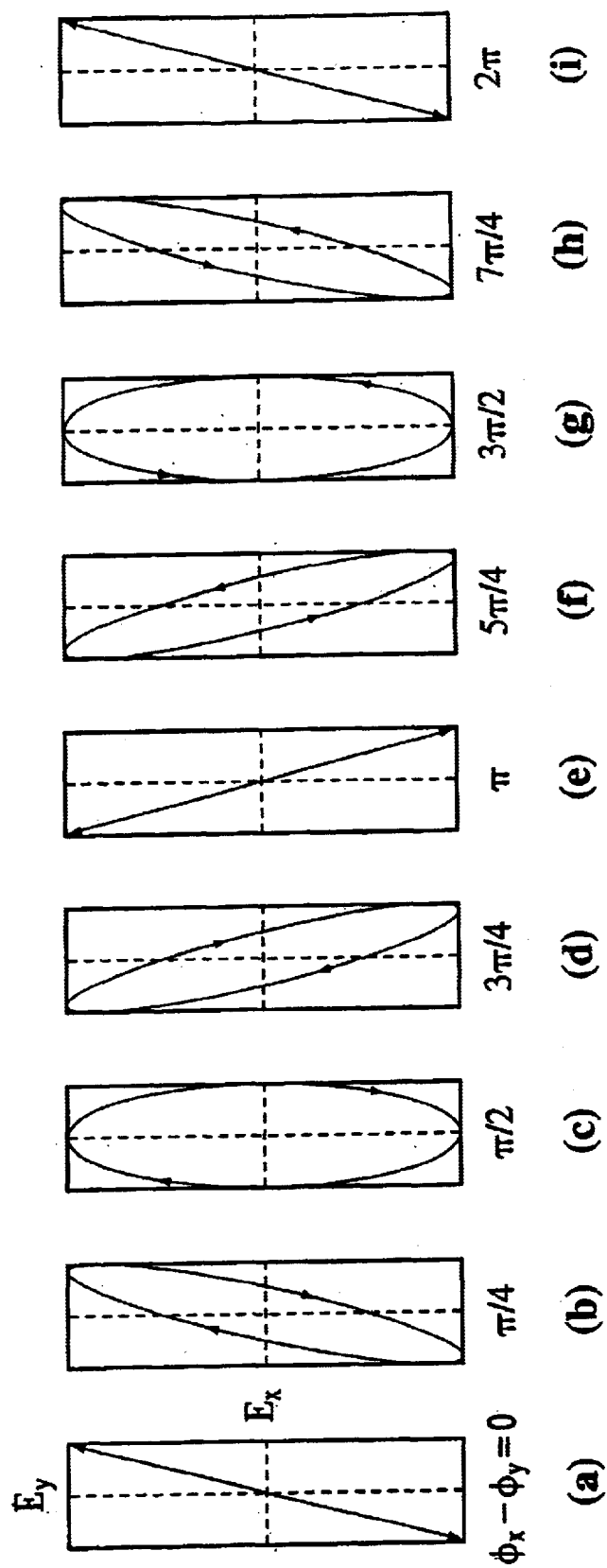

A study of FIGS. 1(A) to 1(I) reveals that, when the phase difference $(\phi_x-\phi_y)=0=\pi=2\pi$, an angle formed by the electric field vector E and the x-y coordinate axis is always constant regardless of time and becomes so-called linearly-polarized light. Assuming that an action in which the phase difference $(\phi_x-\phi_y)$ increases by $\pi$ is applied to the linearly-polarized light in which the phase difference $(\phi_x-\phi_y)=0$ as shown in FIG. 1(A), then the phase difference $(\phi_x+\phi_y)$ becomes $\pi$, which provides linearly-polarized light shown in FIG. 1(E). This is equivalent to the fact that a polarization angle of linearly-polarized light is rotated by the application of the action in which the phase difference $(\phi_x-\phi_y)$ is changed by only $\pi$.

Figure 2:
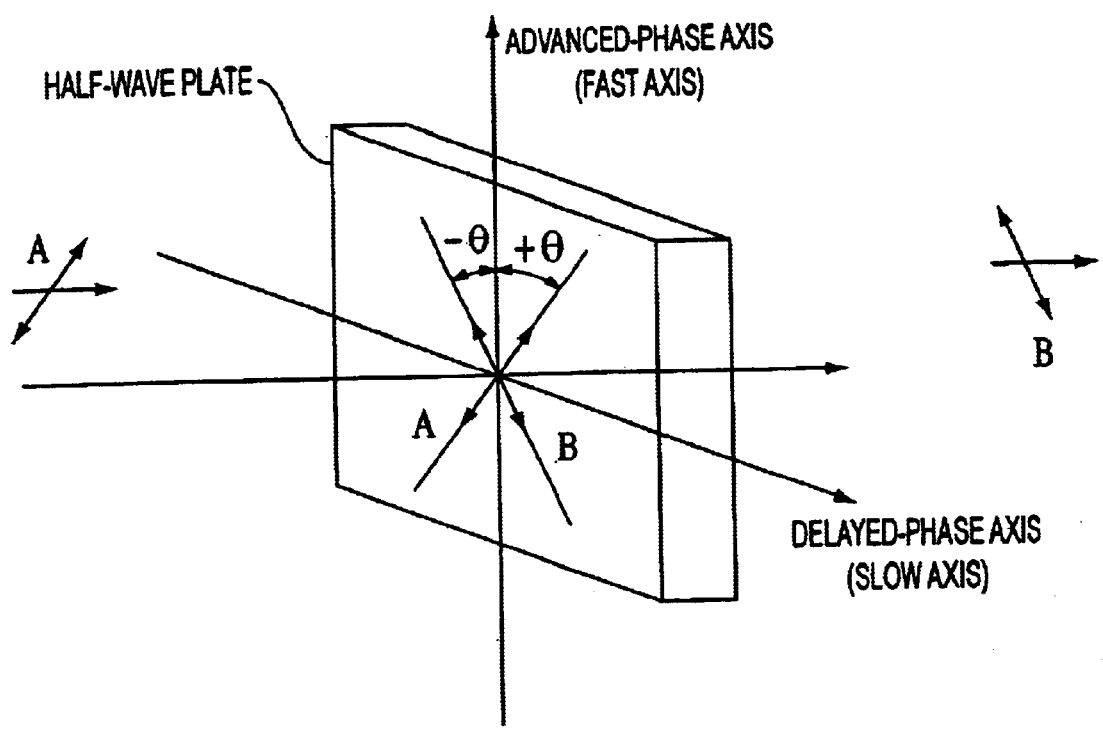
FIG. 2 is a diagram used to explain a function of a half-wave plate.

In actual practice, as an optical element which acts as described above, there is known a half-wave plate shown in FIG. 2. In this optical element, a light path difference Δ between an advanced-phase axis and a delayed-phase axis is given by the following equation (2):

$$\Delta=(m+\tfrac{1}{2})*\lambda \tag{2}$$

where m represents an integer and λ represents the wavelength. Thus, when light passes this optical element, the change of $\pi$ occurs in the aforementioned phase difference $(\phi_x-\phi_y)$. If light A of linearly-polarized light having a polarization angle of an angle θ (0 degree<θ<90 degrees) relative to the advanced-phase axis is incident on and passes through the half-wave plate as shown in FIG. 2, then passed light B becomes linearly-polarized light having a polarization angle of an angle θ on the opposite side relative to the advanced-phase axis. From this, if the action of the half-wave plate is used, then when the angle θ formed by the advanced-phase and the incident linearly-polarized light is controlled, it is possible to obtain passed light which forms an angle of 2θ between it and the incident linearly-polarized light.

It is expected that similar effects may be achieved by reflected light instead of the passed light. This will be described below with reference to FIG. 3. In the case of reflected light, since light passes the optical element twice when it is introduced into and reflected on the optical element, it is sufficient to use the half effect of the half-wave plate, i.e. quarter-wave plate. In this optical element, the light path difference Δ between the advanced-phase axis and the delayed-phase axis is given by the following equation (3):

$$\Delta=(m+¼)*\lambda \qquad (3)$$

where m represents an integer and λ represents the wavelength. Thus, when light passes through this optical element, the change of π/2 occurs in the aforementioned phase difference ($\phi_x - \phi_y$). A study of FIGS. 1(A) to 1(I) reveals that, when such change of the phase difference ($\phi_x - \phi_y$) occurs, the following changes will occur:

(1) If incident light is linearly-polarized light shown in FIG. 1(A), for example, then such light becomes circularly-polarized as shown in FIG. 1(C), for example.

(2) If incident light is circularly-polarized light shown in FIG. 1(C), then such light becomes linearly-polarized as shown in FIG. 1(E), for example.

Figure 3:
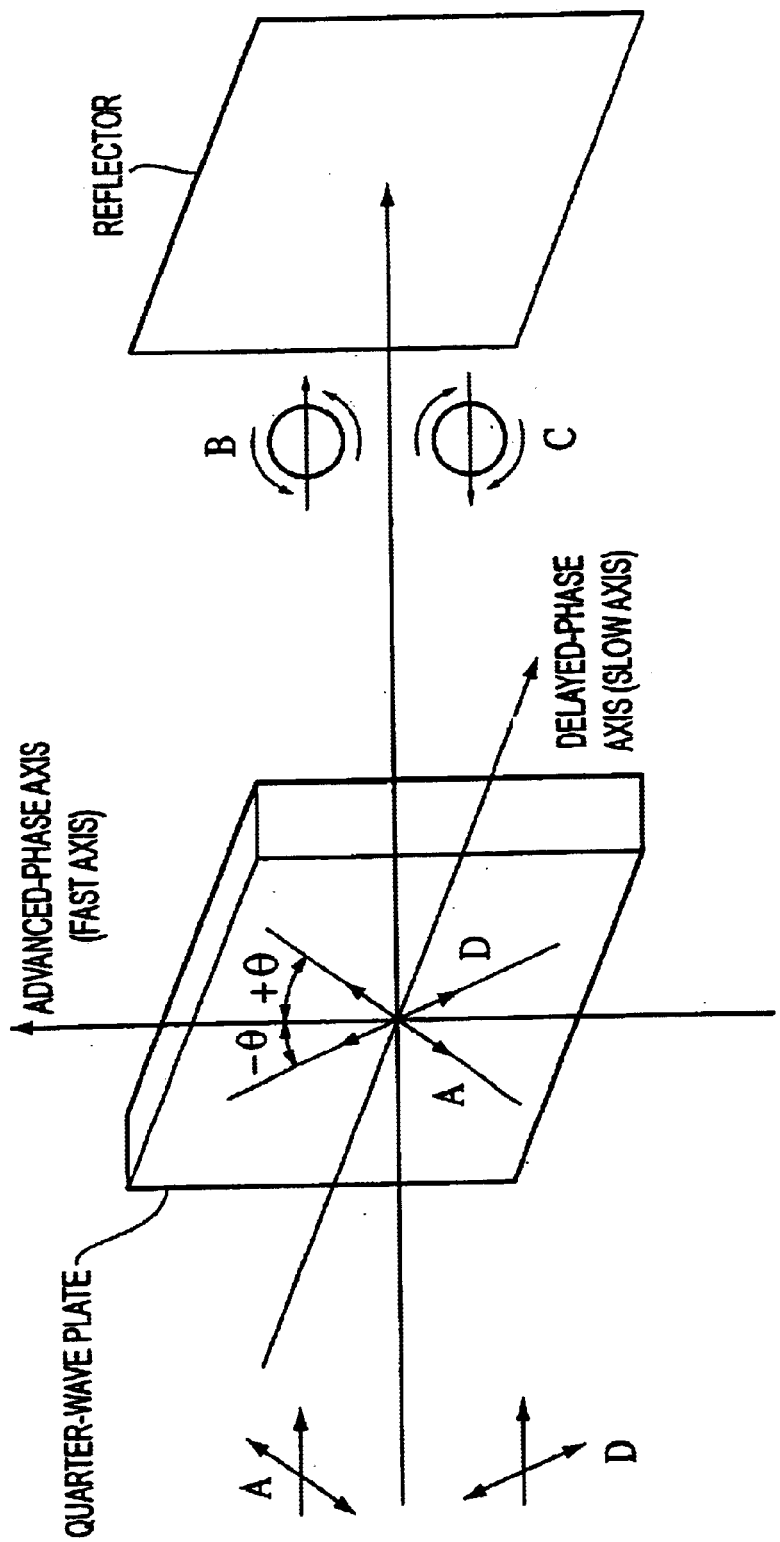
FIG. 3 is a diagram used to explain a function of a quarter-wave plate.

Accordingly, if linearly-polarized light A having a polarization angle of an angle θ (0 degrees<θ<90 degrees) relative to the advanced-phase axis as shown in FIG. 3 is incident on and passes through the quarter-wave plate, then transmitted light B becomes circularly-polarized in a counter-clockwise direction. Thereafter, if the transmitted light B is reflected by the reflector, the reflected light C becomes circularly-polarized in a clockwise direction. Then, the reflected light C is introduced into the quarter-wave plate from the opposite side, and the transmitted light D becomes linearly-polarized having a polarization angle of an angle θ relative to the advanced-phase axis on the opposite side of the first incident light A. Consequently, the first incident light A and reflected light D obtained by reflection form an angle of 2 θ around the advanced-phase. If light is passed through the quarter-wave plate twice by effectively utilizing the reflector, then it is possible to achieve effects similar to those of the half-wave plate.

As described above, even when either the half-wave plate or the combination of the reflector and the quarter-wave plate is used, and if the polarization angle θ of the incident linearly-polarized light is controlled, then the polarization angle of the passed or reflected linearly-polarized light may be set to the angle of 2θ relative to the incident light.

An optical recording material which achieves the aforementioned effects of the half-wave plate and the quarter-wave plate is described below. As the above-mentioned optical recording material, there may be used any material so long as such material demonstrates a photo-induced birefringence and such photo-induced birefringence may be recorded/retained. Here, the photo-induced birefringence is referred to as a property in which an anisotropy of refractive index (birefringence) is produced when light is incident on an initially isotropic medium.

As an example of a material capable of demonstrating such photo-induced birefringence, there is known a polymer or liquid crystal polymer having a photo-isomerized group in a side chain or polymer material in which isomerized molecules are dispersed. Although this material is normally isotropic from a macroscopic standpoint, if it is irradiated with linearly-polarized light, then an photoisomerization is induced, thereby producing anisotropy of refractive index. As the group or molecule that may be photoisomerized, a group or molecule that demonstrates a large birefringence by photoisomerization is desired, and such group or molecule that contains an azobenzene skeleton is preferred. A polymer or liquid crystal polymer material having an photoisomerization group or molecule is desired in which anisotropy at the photoisomerization group is transmitted to the polymer or liquid crystal polymer so that a large birefringence occurs on the whole of the polymer or liquid crystal polymer and that the birefringence can be recorded. For example, a polymer or liquid crystal polymer which is made of at least a kind of monomer selected from polyesters, or polyethylene methacrylate or polyvinyl alcohol should be suitable. An azobenzene will be described below as an example of photoisomerized group.

Figure 4A:
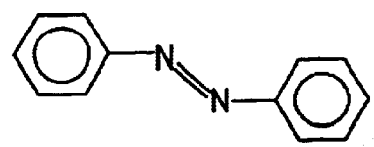
FIG. 4(A) is a chemical formula showing a trans form of azobenzene.
Figure 4B:
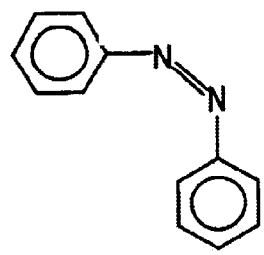
FIG. 4(B) is a chemical formula showing a cis form of azobenzene.

Azobenzene demonstrates trans-cis photoisomerization by the irradiation of light. When the azobenzene in trans form, a molecular structure thereof becomes as shown in FIG. 4(A). On the other hand, when the azobenzene is in cis form, a molecular structure thereof becomes as shown in FIG. 4(B).

Figure 5A:
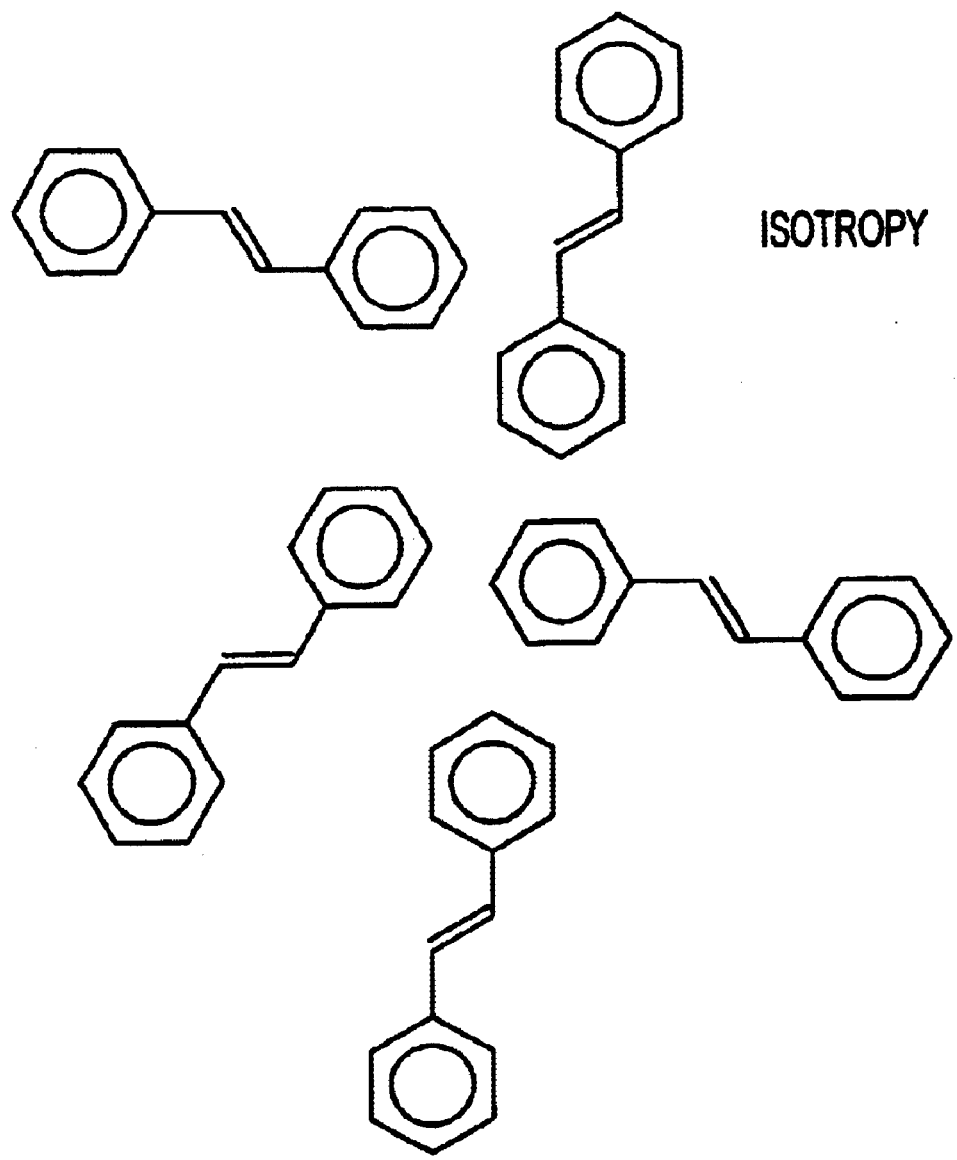
FIG. 5(A) is a diagram showing the state in which azobenzene of a trans form is dispersed.
Figure 5B:
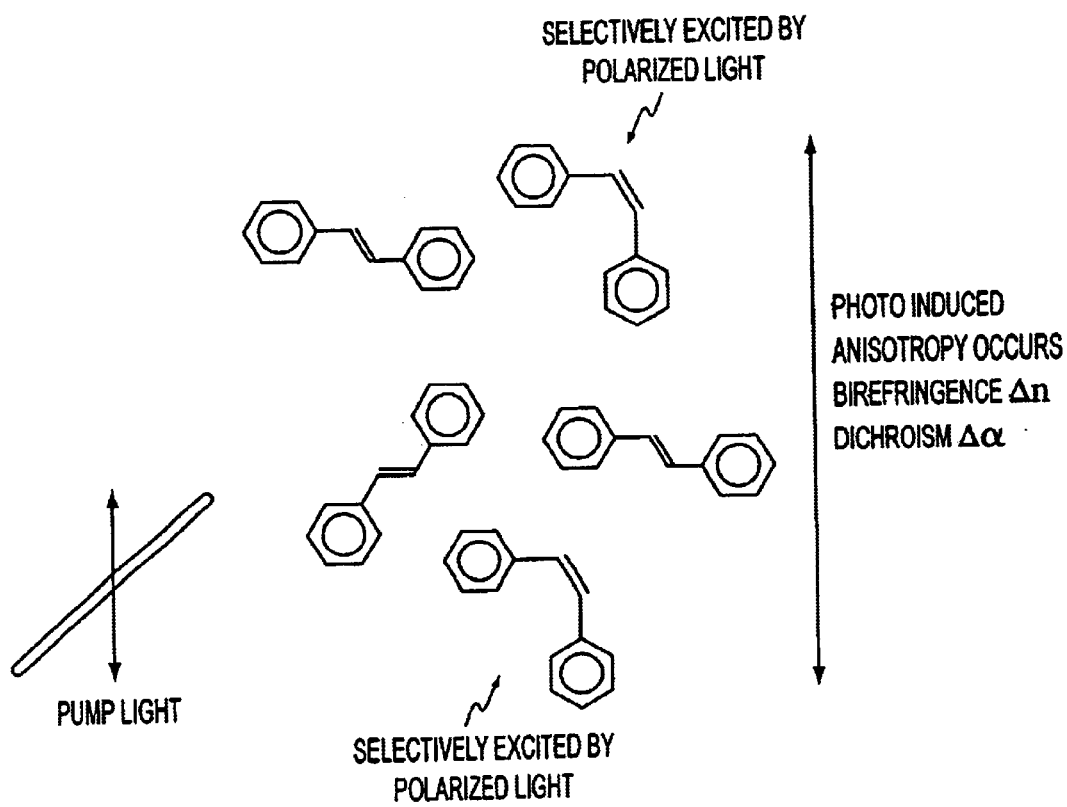
FIG. 5(B) is a diagram showing the state in which azobenzene of a trans form is changed into azobenzene of a cis structure by excitation of light.

Although a simple substance of azobenzene demonstrates anisotropy, when the azobenzene is randomly dispersed in a recording material as shown in FIG. 5(A), the whole of the recording material demonstrates isotropy. Also, in the recording material, before the azobenzene is photoexcited, it is frequently observed that most of azobenzene is in trans form. On the other hand, when the azobenzene is photoexcited optically, there exists a large amount of azobenzene in cis form in the recording material. In particular, when this recording material is irradiated with linearly-polarized pump light having a certain polarization direction, only azobenzene of the same direction as that of the polarization direction absorbs light and changes to the cis form as shown in FIG. 5(B). In this case, a birefringence of azobenzene itself caused by the anisotropy of azobenzene and a birefringence of the polymer or liquid crystal polymer induced by the isomerization of azobenzene are combined to cause a birefringence having a polarization direction of the pump light in the optical recording medium. By effectively utilizing this birefringence, the polymer film can function as the aforementioned wave plate.

Assuming that this kind of polymer film is used as a quarter-wave plate, if d is a thickness of a polymer film and Δn is a photo-induced refractive index change, a light path difference caused when light having a wavelength λ passes the polymer film becomes Δn·d. Thus, when this light path difference agrees with λ/4 or some whole number of wavelengths λ+λ/4, the polymer film may function as the quarter-wave plate. That is, it is sufficient that a birefringence may be induced so as to satisfy the condition of the following equation (4):

$$\Delta n \cdot d=(m+¼)\lambda \qquad (4)$$

where m is an integer.

Similarly, when this polymer film is used as the half-wave plate, it is sufficient that the light path difference Δn·d agrees with λ/2. That is, it is sufficient that a birefringence may be induced so as to satisfy the condition of the following equation (5):

$$\Delta n \cdot d=(m+½)\lambda \qquad (5)$$

where m is an integer.

Figure 4C:
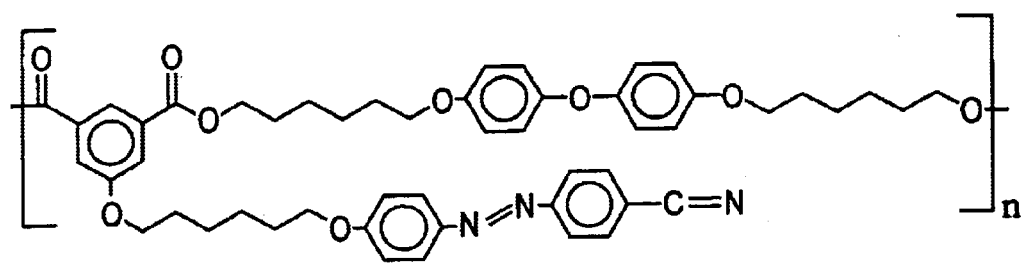
FIG. 4(C) is a chemical formula showing a polyester polymer having cyanoazobenzene in a side chain.
Figure 6A:
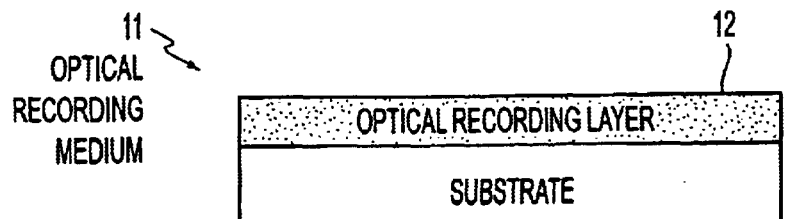
FIGS. 6(A) through 6(D) are diagrams showing structures of optical recording media according to the present invention, respectively.
Figure 6B:
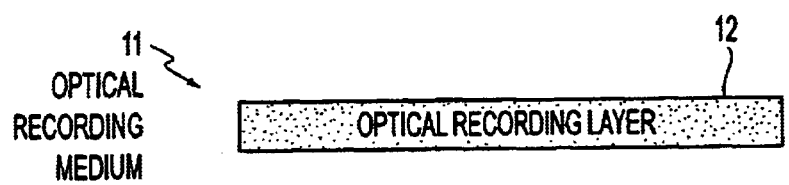

Recording characteristics of the optical recording material used in the present invention will be described next with reference to the drawings. As the optical recording material, there is used polyester having cyanobenzene as a side chain shown in FIG. 4(C). An optical recording medium 11 using this material will be described with reference to FIGS. 6(A) to 6(D). FIGS. 6(A) and 6(B) show an embodiment of an optical recording medium used in the system for recording and reproducing data by transmitting light.

Figure 6C:
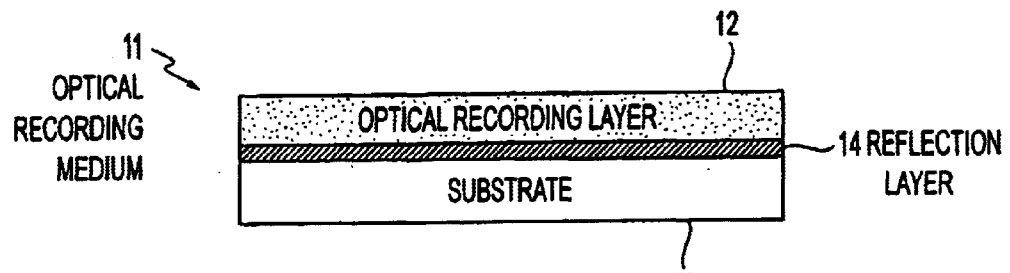
Figure 6D:

In the optical recording medium 11 shown in FIG. 6(A), an optical recording layer 12 made of or containing a sufficient amount of the above-mentioned optical recording material is formed on one surface of a transparent substrate 13 such as a glass substrate. As another embodiment, the optical recording medium 11 may be formed of only the optical recording layer 12 as shown in FIG. 6(B). FIGS. 6(C) and 6(D) show embodiments of an optical recording medium used in the system for recording and reproducing data by reflecting light. In the optical recording medium 11 shown in FIG. 6(C), a reflection layer 14 is preferably formed on one surface of a substrate 13, such as a glass or a resin, by vapor deposition of aluminum, and the optical recording layer 12 is formed over the reflection layer 14. Also, as another embodiment, as shown in FIG. 6(D), the optical recording medium 11 may be formed of a bilayer structure comprising the reflection layer 14 and the optical recording layer 12. In any of the embodiments, the optical recording medium may be a sheet-like or disk-like optical recording medium.

Figure 7:
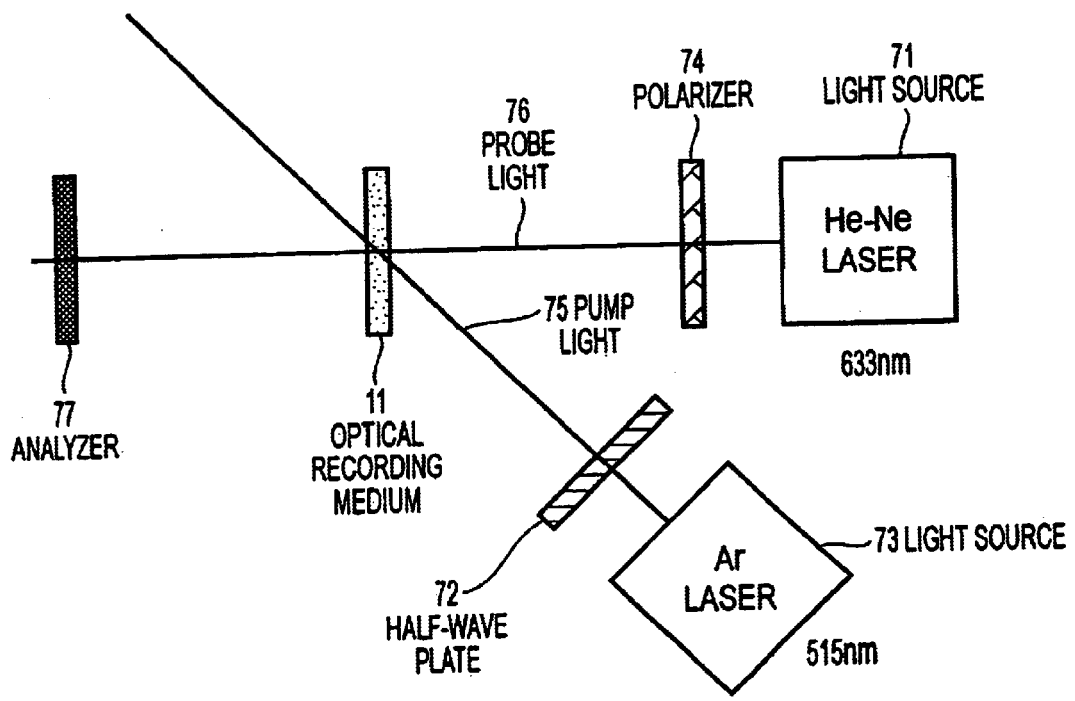
FIG. 7 is a diagram showing an optical system that is used to measure recording characteristics.

With respect to the optical recording medium 11 of the shape shown in FIG. 6(A), recording characteristics of photo-induced birefringence were measured by an optical system shown in FIG. 7. The thickness of the optical recording layer 12 was 20 μm.

As a light source 73 for emitting pump light 75 used to induce an anisotropy (birefringence) in the optical recording medium 11, there was used an argon-ion laser having a wavelength of 515 nm which is effective in inducing birefingence in polyester having cyanobenzene in a side chain. A polarization of light emitted from the light source 73 has an s-polarization (perpendicular to the sheet of drawing). The laser beam travels through a half-wave plate 72 and is incident on the optical recording medium 11. The direction of anisotropy induced in the optical recording medium 11 is changed when a polarization angle of pump light 75 is changed by the half-wave plate 72. The direction of anisotropy thus induced is measured by probe light 76 generated by a light source 71 different from the light source of the pump light 75. In this example, the pump light 75 and the probe light 76 are at an angle of approximately 10° relative to each other. In general the smaller the angle between the pump light 75 and the probe light 76, the easier it is to accurately measure the birefrengence in the recording medium 11. The light source 71 was a helium-neon laser having a wavelength of 633 nm, which does not affect the anisotropy induced in the optical recording medium 11. This laser beam is passed through a polarizer 74 and thereby serves as s-polarized (perpendicular to the sheet of drawing) light. This light 76 is incident on the optical recording medium 11, and transmitted light is introduced into an analyzer 77. If a birefringence is induced in the optical recording medium 11 by the irradiation of the pump light 75, the polarization direction of probe light 76 transmitted through the optical recording medium 11 is rotated. The polarization direction of the probe light 76 that was passed through the optical recording medium 11 is examined by rotating the analyzer 77.

When a birefringence is photo-induced, the probe light 76 is not emitted; only the pump light 75 is incident on the optical recording medium 11. A light intensity of the pump light 75 was selected to be 1.34 W/cm$^2$, and the recording was made for 20 seconds. Thereafter the irradiation of the pump light 75 was stopped, and the photo-induced birefringence was measured by only the probe light 76.

Figure 8A:
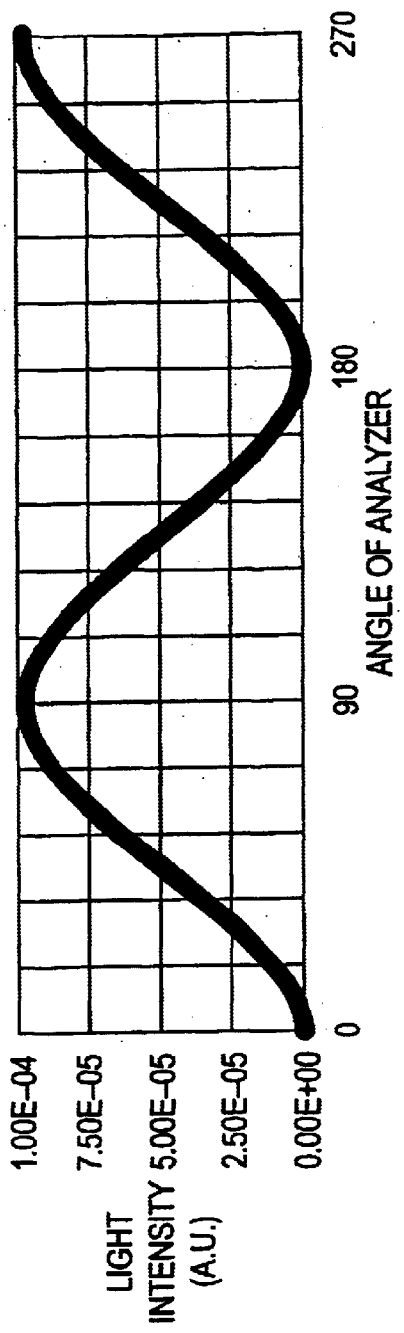
FIGS. 8(A) to 8(D) are diagrams showing recording characteristics in a first experiment of optical recording media according to the present invention.
Figure 8B:
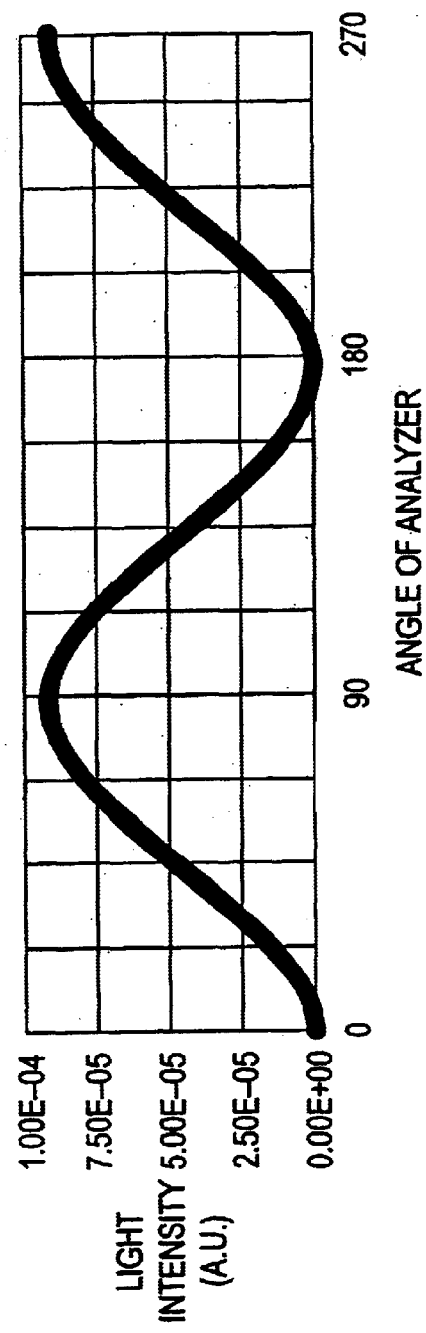
Figure 8C:
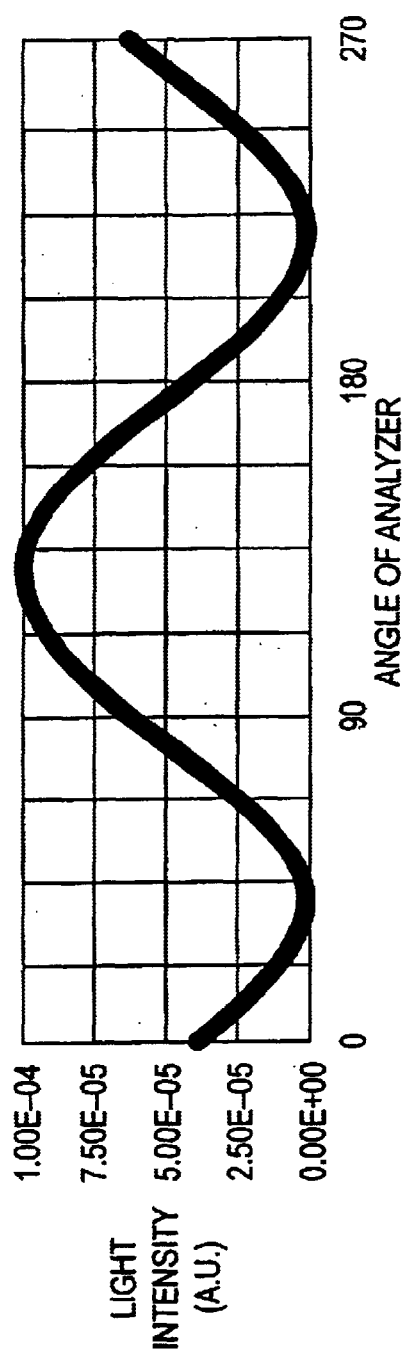
Figure 8D:
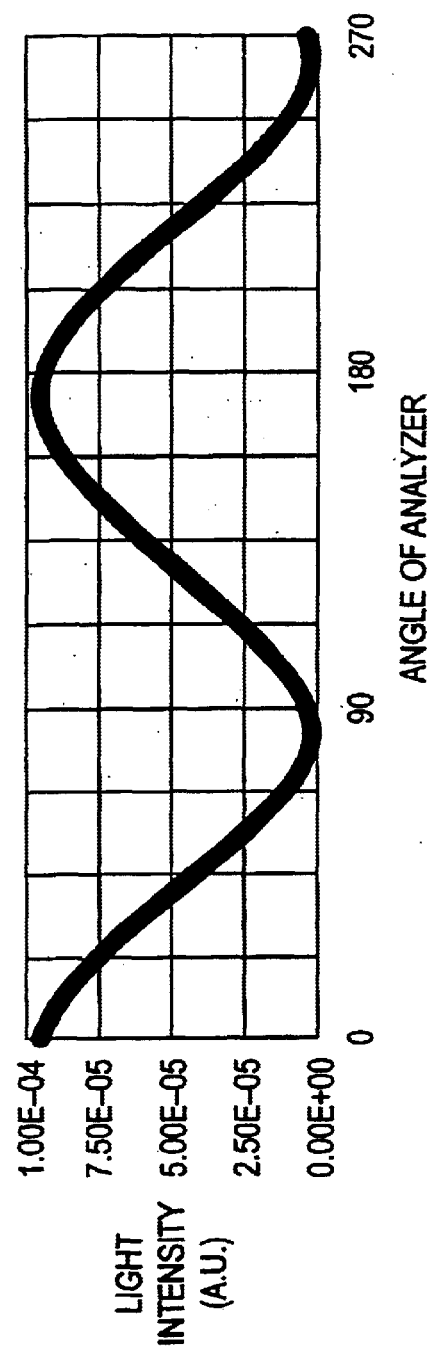
Figure 8E:
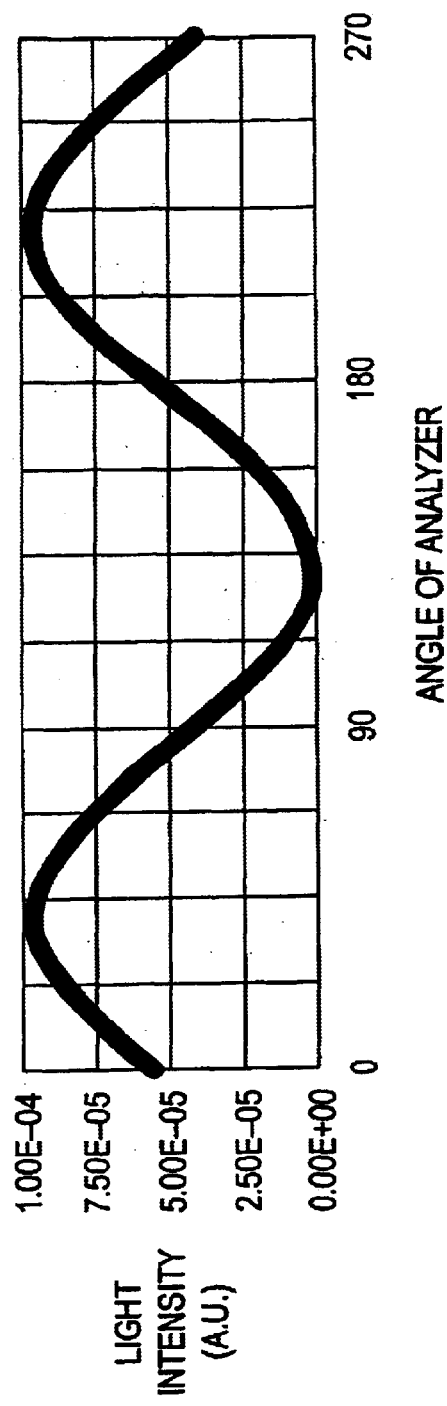

FIGS. 8(A) to 8(D) show the measured results of birefringence recording characteristics obtained when the probe light 76 was passed through the optical recording medium 11 after the birefringence was induced in the optical recording medium 11 by changing the polarization angle of the pump light 75. The horizontal axis shows a polarization rotation angle of the analyzer 77, and an angle of 90 degrees agrees with the detection of s-polarized light. The vertical axis shows an intensity of light passed through the analyzer 77. FIG. 8(A) shows characteristics of the probe light 76 obtained when the pump light 75 is not emitted. As is clear from FIG. 8(A), since the intensity of light passed through the analyzer 77 increases at an angle of 90 degrees, the probe light 76 is s-polarized. Before the pump light 75 is applied to the optical recording medium 11, the optical recording medium 11 is isotropic. When the probe light 76 is passed through the optical recording medium 11, the polarization angle of the probe light 76 is not changed at all. FIG. 8(B) shows the measured results obtained when a photo-induced birefringence was recorded on the optical recording medium 11 under the condition that the pump light 75 was provided as s-polarized light by the half-wave plate 72. From FIG. 8(B), it is clear that an intensity of light passed through the analyzer 77 increased at 90 degrees and 270 degrees. Although not apparent from the measured results, a birefringence was recorded on the optical recording medium 11 by the pump light 75. FIG. 8(C) shows measured results obtained when the photo-induced birefringence was recorded on the optical recording medium 11 while the polarization angle of the pump light 75 was changed from s-polarized light by only 22.5 degrees with the half-wave plate 72. From FIG. 8(C), it is clear that an intensity of light passed through the analyzer 77 increased at 130 degrees. The detected polarization angle change of the probe light 76 between FIG. 8(B) and FIG. 8(C) (90 degrees detected polarization angle to 130 degrees detected polarization angle) is nearly twice the polarization angle change of the pump light 75 (22.5 degrees). Accordingly, the recording medium has optically acted substantially as a half-wave plate to adjust the polarization angle of the probe light 76. FIG. 8(D) shows the measured results obtained when the photo-induced birefringence was recorded on the optical recording medium 11 after the polarization angle of the pump light 75 was changed from s-polarized light by 45 degrees using the half-wave plate 72. From FIG. 8(D), it is clear that an intensity of probe light 76 passed through the analyzer 77 increased at 175 degrees. Thus, the polarization angle of the probe light 76 was shifted by 85 degrees, approximately twice the change in angle (45 degrees) of the pump light 75. FIG. 8(E) shows the results obtained when the photo-induced birefringence was recorded on the optical recording medium 11 while the polarization angle of the pump light 75 was changed from s-polarized light by 67.5 degrees using the half-wave plate 72. FIG. 8(E) shows an intensity of the probe light 76 passed through the analyzer 77 increases at 220 degrees. Again, the polarization angle of the probe light 76 was adjusted by an angle twice the change in polarization angle of the pump light 75. That is, the probe light 76 polarization angle was adjusted by 130 degrees, nearly twice the 67.5 degree change in polarization angle of the pump light 75.

The above example shows how the optical recording medium according to the invention can be arranged to operate substantially as a half-wave plate. However, the optical recording medium can be arranged to operate substantially as a quarter-wave plate, or as another optical element that adjusts the polarization angle of light acted on by the optical element. In a second experiment, the optical system shown in FIG. 7 was used to show another aspect of the optical recording medium according to the invention. In this experiment, the FIG. 7 optical system was configured substantially the same as described above, except that the thickness of the optical recording layer 12 was 2 μm, the intensity of the pump light 75 was 1 W/cm², and recording was performed for 20 seconds.

Figure 9A:
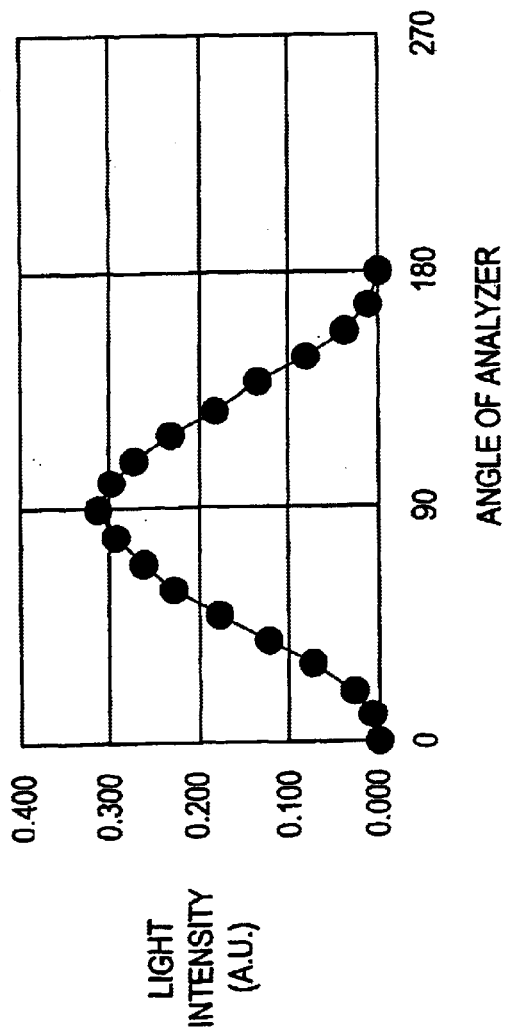
FIGS. 9(A) to 9(D) are diagrams showing recording characteristics in a second experiment of optical recording media according to the present invention.
Figure 9B:
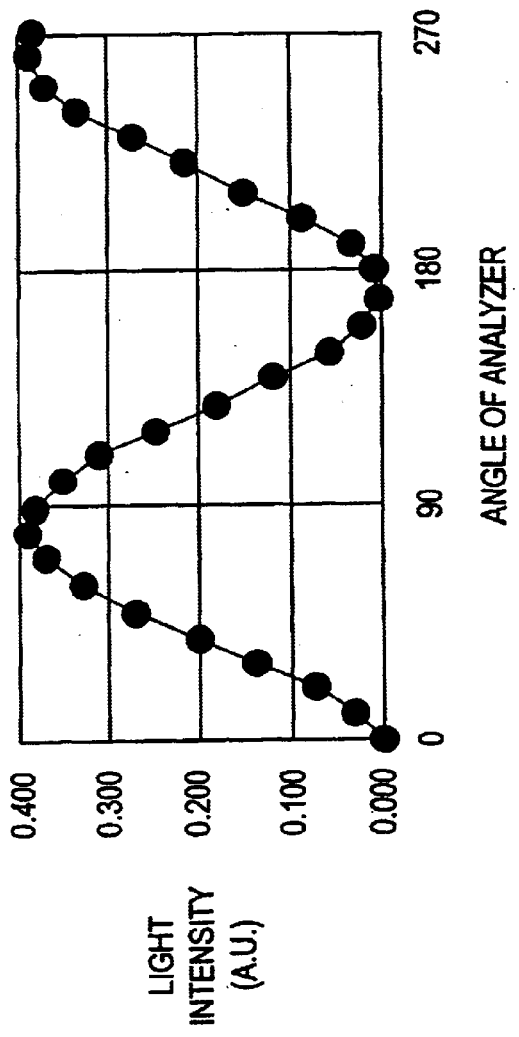
Figure 9C:
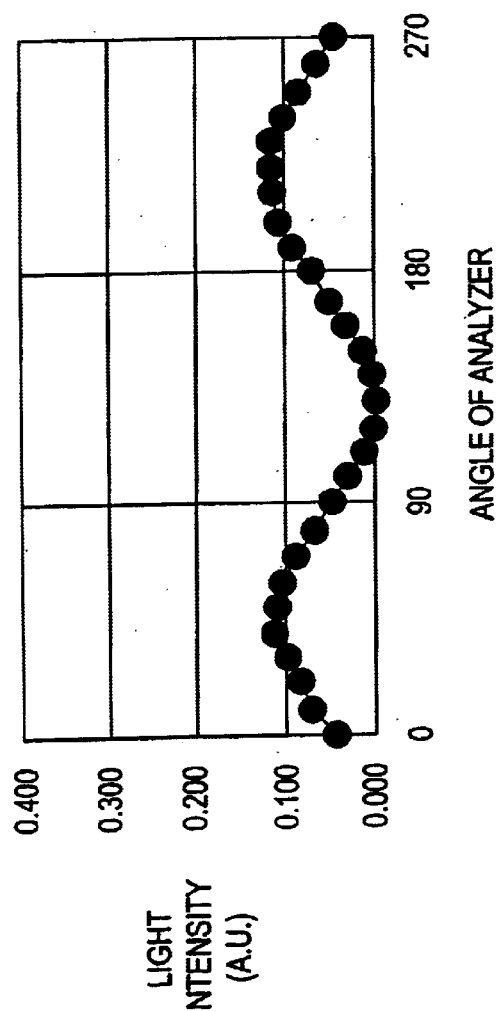
Figure 9D:
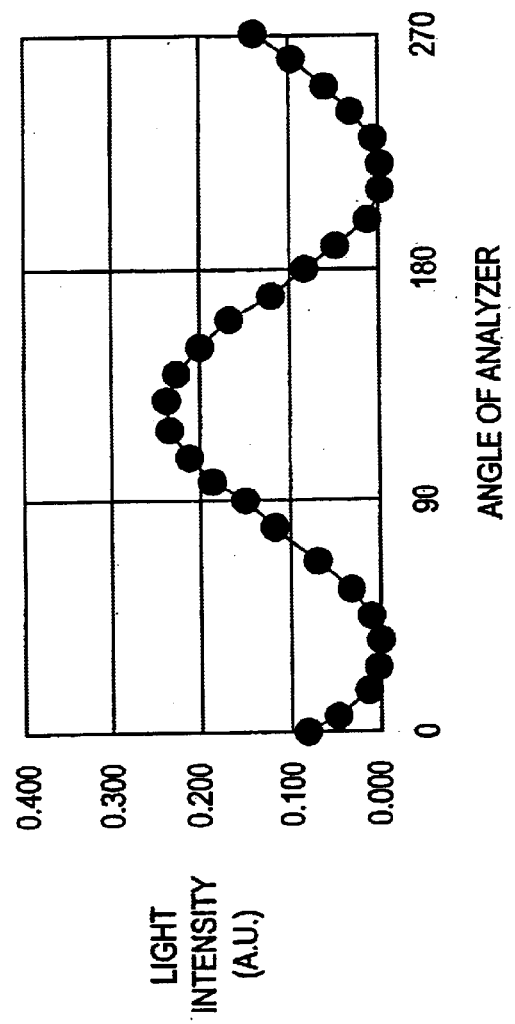

FIGS. 9(A) to 9(D) show the measured results of birefringence recording characteristics obtained in the second experiment. The horizontal axis shows a polarization rotation angle of the analyzer 77, and an angle of 90 degrees agrees with the detection of s-polarized light. The vertical axis shows an intensity of light passed through the analyzer 77. FIG. 9(A) shows characteristics of the probe light 76 obtained when the pump light 75 was not emitted. As is clear from FIG. 9(A), since the intensity of light passed through the analyzer 77 increases at an angle of 90 degrees, the probe light 76 is s-polarized. Before the pump light 75 is applied to the optical recording medium 11, the optical recording medium 11 is isotropic. When the probe light 76 is passed through the optical recording medium 11, the polarization angle is not changed at all. Then, FIG. 9(B) shows the measured results obtained when the photo-induced birefringence was recorded on the optical recording medium 11 under the condition that the pump light 75 was provided as s-polarized light by the half-wave plate 72. From FIG. 9(B), it is clear that an intensity of light passed through the analyzer 77 increased at 80 degrees and 260 degrees. From this, it can be understood that a birefringence was recorded on the optical recording medium 11 by the pump light 75. FIG. 9(C) shows measured results obtained when the photo-induced birefringence was recorded on the optical recording medium 11 after the polarization angle of the pump light 75 was changed from s-polarized light by 30 degrees using the half-wave plate 72. From FIG. 9(C), it is clear that an intensity of light passed through the analyzer 77 increased at 40 degrees and 220 degrees. From this, it can be understood that the azimuth of the birefringence recorded on the optical recording medium 11 was shifted by 40 degrees, which is an amount greater than the change in polarization angle of the pump light 75 (30 degrees). Further, FIG. 9(D) shows the measured results obtained when the photo-induced birefringence was recorded on the optical recording medium 11 after the polarization angle of the pump light 75 was changed from s-polarized light by 60 degrees using the half-wave plate 72. From FIG. 9(D), it is clear that an intensity of light passed through the analyzer 77 increased at 130 degrees. From this, it can be understood that the azimuth of the birefringence recorded on the optical recording medium 11 was shifted by 90 degrees, which is greater than the change in polarization angle (60 degrees) of the pump light 75.

A study of the above-mentioned measured results reveals that birefringence can be induced and recorded in the polyester having cyanobenzene in a side chain and that the azimuth of the birefringence can be rotated in accordance with the rotation of the polarization angle of the pump light 75. Also, it was confirmed that the recorded photo-induced birefringence can be held sufficiently for a long period of time at a room temperature, e.g., at least several months and possibly several years. Further, each recording in which the polarization angle of the pump light 75 was changed is executed in the same area and, in particular, the processing for erasing the previous recording was not carried out. From this, it was confirmed that the next data can be overwritten in this optical recording medium 11 without erasing the previous recording.

Figure 10:
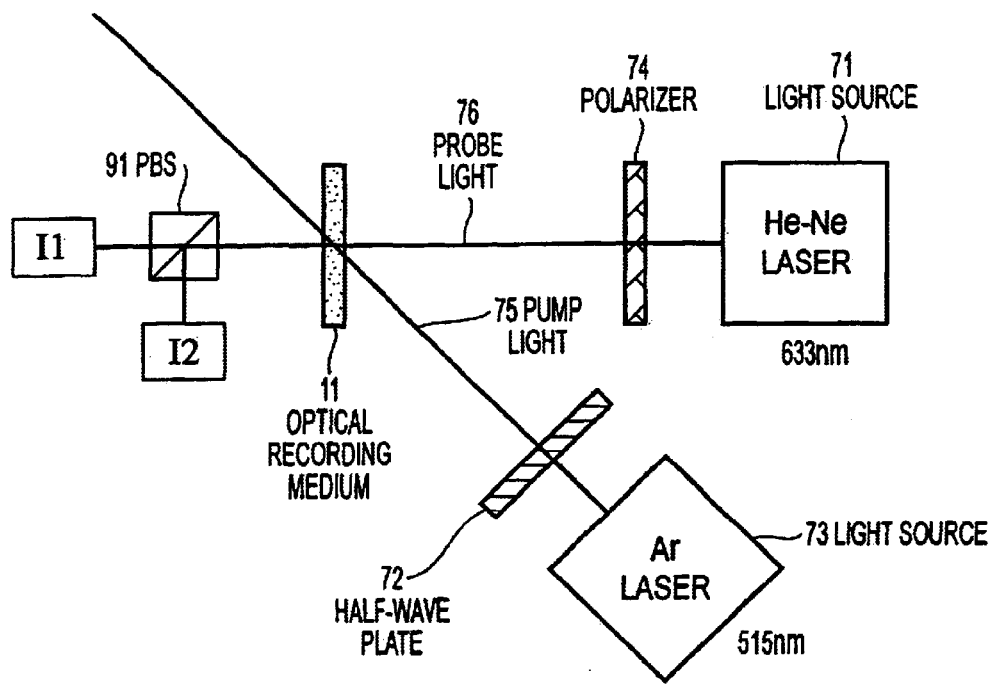
FIG. 10 is a diagram showing an optical system that is used to measure the change of refractive index.
Figure 11:
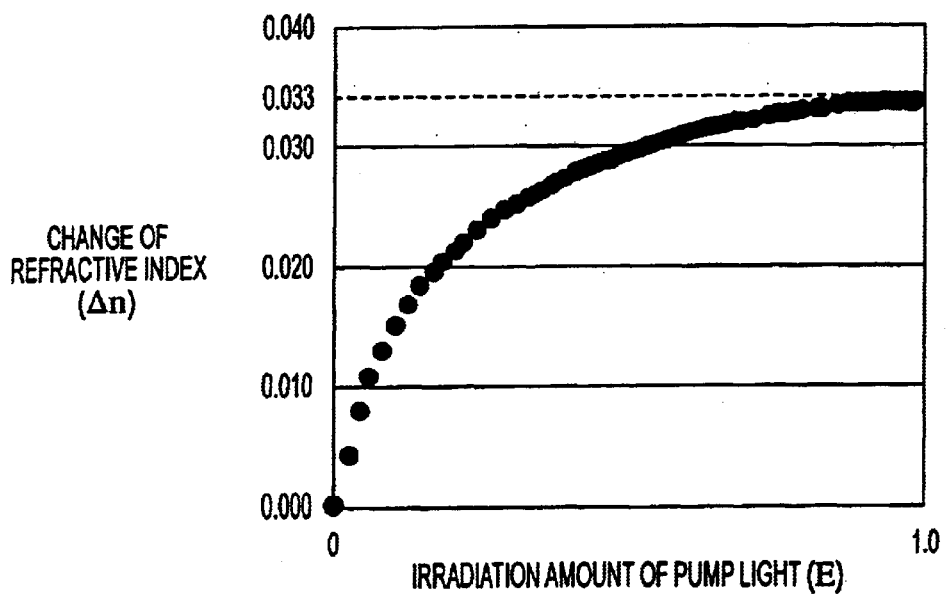
FIG. 11 is a diagram showing saturated characteristics of the change of refractive index.

FIG. 11 shows measured results obtained when the photo-induced refractive index change in an optical recording material was measured by a measuring system shown in FIG. 10. Also in this measurement, characteristics of the optical recording medium 11 of the type shown in FIG. 6(A) were measured. The thickness of the optical recording layer 12 was 2 μm.

In FIG. 10, as the light source 73 of the pump light 75 that is used to induce the anisotropy in the optical recording material, there was used an argon-ion laser having a wavelength of 515 nm, which is effective in inducing a birefringence in polyester having cyanobenzene as a side chain. Light emitted from the light source 73 is s-polarized light (perpendicular to the sheet of drawing), and travels through the half-wave plate 72 to the optical recording medium 11. The polarization angle of the pump light 75 was changed from s-polarized light by only 45 degrees with the half-wave plate 72. The azimuth of the birefringence induced by the pump light 75 is measured by the probe light 76 emitted from the light source 71, which is different from the light source 73 for emitting the pump light 75. The light source 71 was a helium neon laser having a wavelength of 633 nm, which does not affect the anisotropy induced in the optical recording medium 11. This laser beam was passed through the polarizer 74 and thereby provided as s-polarized (perpendicular to the sheet of drawing) light. This light is incident on the optical recording medium 11 and the transmitted light is introduced into a polarizing beam splitter (PBS) 91. The polarizing beam splitter 91 splits an s-polarized component and a p-polarized component of the transmitted probe light 76. The polarizing direction of the probe light 76 that was passed through the optical recording medium 11 may be examined by measuring the respective components with optical power meters 11 and 12. Then, the refractive index change Δn is obtained from the magnitude of the thus determined polarization angle.

During measurement, the birefringence is induced by irradiating an initialized optical recording medium 11 with the pump light 75. The optical recording medium 11 can be initialized by heating the medium 11 and quickly cooling the medium 11, or by irradiating the medium 11 with circularly polarized light such as that shown in FIG. 1(C). The light intensity of this pump light 75 was 1 W/cm². At the same time, the probe light 76 was incident on the optical recording medium 11, and the polarization direction of the probe light 76 transmitted through the optical recording medium 11 was measured by the optical power meters 11 and 12.

FIG. 11 shows measured results of the refractive index change Δn which was determined from the polarization direction of the measured probe light 76. Δn is determined using equation (6).

$$\Delta n = \lambda/\pi \cdot d \, \sin^{-1}(I/I_o)^{1/2} \tag{6}$$

where I is the measured intensity of the transmitted probe light 76, $I_o$ is the initial intensity of the probe light 76, λ is the wavelength of the probe light 76, and d is the thickness of the recording layer.

Here, we assumed that a photo-induced dichroism Δα can be neglected. The horizontal axis in FIG. 11 represents a pump light irradiation amount (product of intensity and time), and a saturated time point of the refractive index change Δn is represented by 1.0. The vertical axis represents the magnitude of the refractive index change Δn calculated by the measurement. From FIG. 11, it is clear that the refractive index change Δn obtained by the birefringence induced by the pump light 75 increases with the irradiation amount of the pump light 75 and eventually becomes saturated. Calculating a saturated refractive index change Δns from FIG. 11, such value becomes about 0.033 with respect to the material used in the test.

As earlier noted, when the type of optical recording material discussed above is used as the half-wave plate or the quarter-wave plate, equation (4) or (5) should be satisfied. Also, in order to manufacture the half-wave plate or the quarter-wave plate whose characteristic is stable, it is clear from equation (4) or (5) that the thickness of the optical recording material and the refractive index change Δn should preferably be made constant. Concerning the refractive index change Δn, the optical recording medium according to this embodiment preferably uses the saturated refractive index change Δns, which is a stable value when a light irradiation amount is greater than a certain light irradiation amount. Thus, the thickness of the half-wave plate or the quarter-wave plate is determined based on the value of the saturated refractive index change Δns and equation (4) or (5). When the optical recording material is manufactured based on the above-mentioned thickness of the half-wave plate or the quarter-wave plate, if the exposure amount is greater than an amount which provides the saturated refractive index change Δns, a predetermined refractive index change Δns may be induced so that stable recording and reproducing may be executed independently of the fluctuation of the light intensity. Also, the light intensity of a laser beam that can be used at present is about $10^5$ to $10^7$ times as large as the light intensity that was used in the measurements discussed above. From this standpoint, the recording speed may be increased in the order of approximately a few ms. However, light amounts less than a saturation light amount can be used to induce a refractive index change Δn that is less than the saturated refractive index change Δns, if desired.

Figure 12:
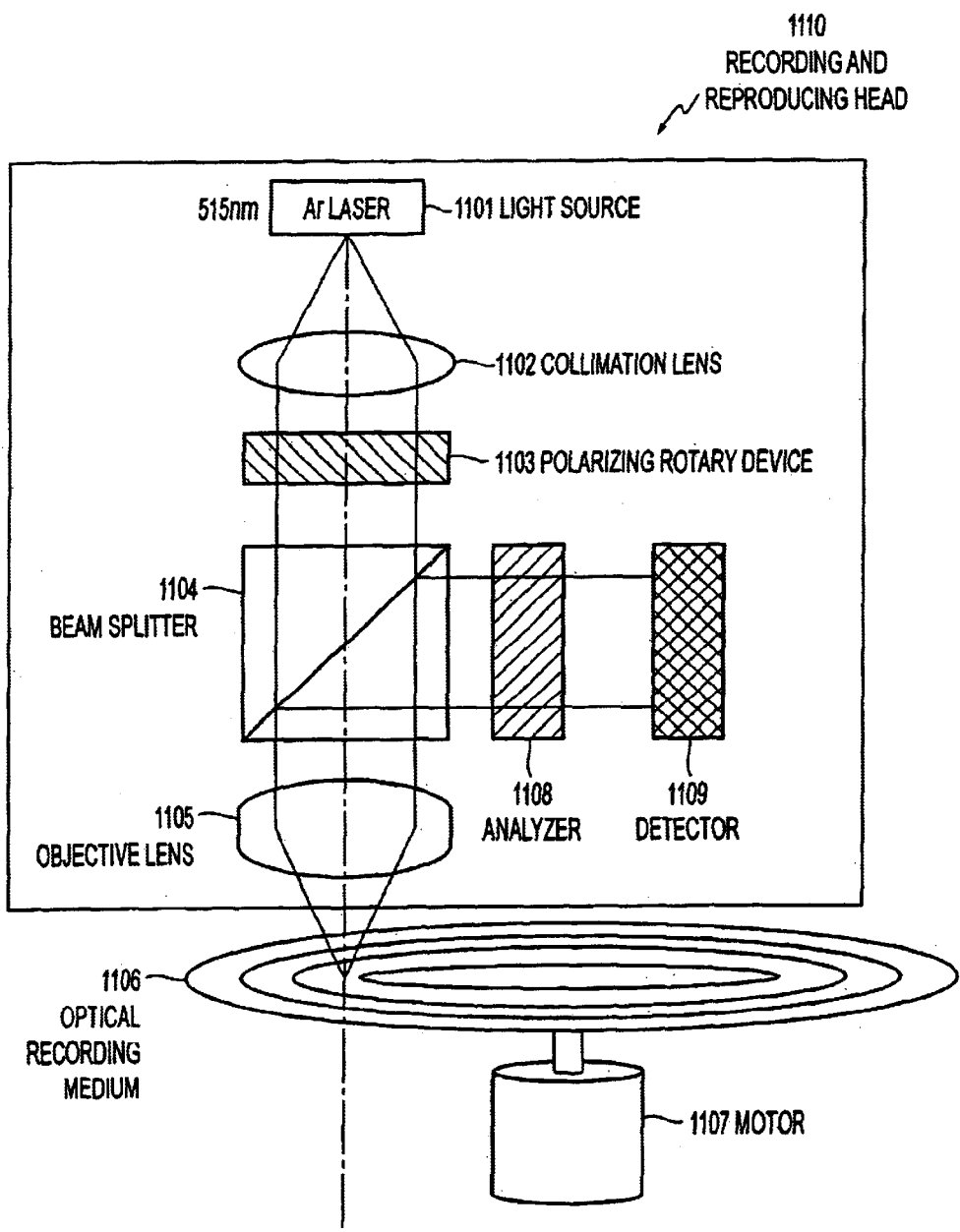
FIG. 12 is a diagram showing an optical recording and reproducing apparatus according to an embodiment of the present invention.

FIG. 12 is a diagram showing an optical recording and reproducing apparatus according to an embodiment of the present invention. This optical recording and reproducing apparatus uses an optical recording medium 1106 of a reflection type preferably having the structure shown in FIG. 6(C) in a disk-shape as shown in FIG. 12. The thickness d of the optical recording material on the optical recording medium 1106 will be described below. Since the optical recording and reproducing of the reflection type are executed, it is sufficient that the optical recording material selectively function as a quarter-wave plate as mentioned above. Accordingly, the thickness d is expressed by the following equation (7) through the transformation of equation (4):

$$d=\lambda/4/\Delta n \qquad (7)$$

The optical recording material is preferably polyester having cyanobenzene as the side chain. Also, the light source 1101 is preferably an argon-ion laser that is effective to alter the index of refraction of the material. Substituting the measured Δn and the wavelength 0.515 μm of the argon-ion laser into equation (7), the thickness d of 3.9 μm is obtained. Accordingly, the thickness d of the optical recording material of the optical recording medium 1106 according to the present invention was selected to be 3.9 μm. Moreover, such a laser was used in which the polarized light of the laser beam was s-polarized. Here, s-polarized light is directed in a direction parallel to the disk surface of the optical recording medium 1106.

In the apparatus shown in FIG. 12, an information recording method will be described initially. A recording laser beam from the light source 1101 is collimated by a collimation lens 1102 to form a parallel beam that is introduced into a polarization rotary device 1103, which serves as a spatial optical modulator. As the polarization rotary device 1103, there may be used a half-wave plate, a liquid-crystal bulb, a Pockels cell, a Faraday device or the like. If a liquid-crystal bulb is taken as an example of the polarization rotary device 1103, since the liquid-crystal functions as a half-wave plate under the condition that a voltage is not applied thereto, the polarization direction of incident light and the axis of the half-wave plate are made initially parallel to each other. Thus, since the incident light is s-polarized light, the transmitted light is s-polarized light. On the other hand, when the maximum voltage is applied to the liquid-crystal, the axis of the half-wave plate is rotated by 45 degrees, and the polarized direction of the incident light is rotated by 90 degrees. The rotation is executed in a direction parallel to the disk surface of the optical recording medium 1106. At an intermediate voltage between the minimum voltage and the maximum voltage, the azimuth of the half-wave plate may rotate up to 45 degrees in response to the magnitude of the voltage. Thus, the light that is transmitted through the polarization rotary device 1103 may change its polarization angle from 0 to 90 degrees in response to the voltage supplied to the polarization rotary device 1103. Preferably, the polarization angle of the s-polarized light is set to 0 degrees. The recording light transmitted by the polarization rotary device 1103 passes through a beam splitter 1104 and an objective lens 1105. The objective lens 1105 focuses the recording light on the optical recording medium 1106. Thus, the photo-induced birefringence can be recorded on the optical recording medium 1106 as earlier noted.

Figure 13:
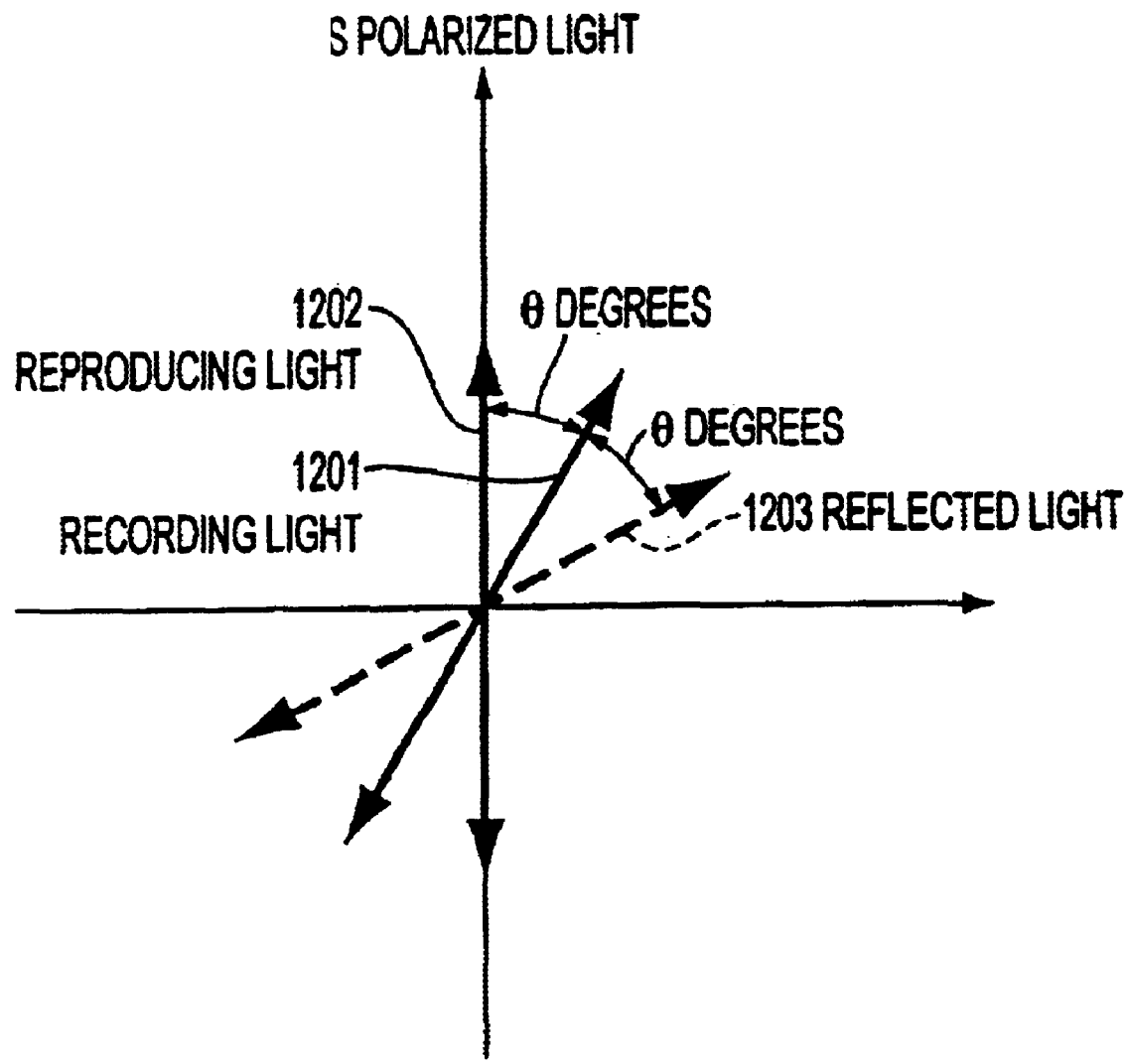
FIG. 13 is a diagram used to explain an optical recording and reproducing method according to the present invention.

By controlling the voltage applied to the polarization rotary device 1103, it is possible to change the polarization angle θ of the recording light from 0 to 90 degrees. As a consequence, as shown in FIG. 13, an azimuth of a very small quarter-wave plate formed by the birefringence induced by recording light 1201 may be set to θ ($0 \leq \theta < 90$) degrees. When data is recorded using this controllable angle θ, it is possible to record information in a multilevel fashion. The dynamic range that may be used in recording is as wide as 90 degrees, and the polarization rotary device 1103 may rotate the polarization of light at a high S/N ratio regardless of angle. Since information is preferably recorded on the recording medium 1106 using an amount of light greater than the saturation light amount as earlier noted, information may be stably recorded independently of the fluctuation of light intensity. Therefore, according to the multilevel recording method and apparatus, information may be stably recorded at a high S/N independently of the gradation value. However, light amounts less that the saturation light amount can be used to record information, if desired.

A method of reproducing recorded information will be described next with reference to FIG. 12. Reproducing laser light from the light source 1101 is collimated by the lens 1102 as parallel light and then introduced into the polarization rotary device 1103. However, the light intensity obtained at that time is considerably decreased as compared with that used in the recording so as not to destroy the recorded photo-induced anisotropy. Although this reproducing light is introduced into the polarization rotary device 1103, no voltage is applied to the polarization rotary device 1103 so that the transmitted light is s-polarized. Further, the reproducing light that passes through the polarization rotary device 1103 is transmitted through the beam splitter 1104 and introduced into the objective lens 1105. This objective lens 1105 focuses the reproducing light on the optical recording medium 1106. Thereafter, the reproducing light is incident on the recorded very small quarter-wave plate, is reflected by the reflection layer disposed within the recording medium 1106, passes again through the very small quarter-wave plate, and outputted from the optical recording medium 1106 as reflected light. The incident reproducing light 1202 is s-polarized as shown in FIG. 13, and the azimuth of the recorded very small quarter-wave plate is shifted by the angle θ from the direction of the s-polarized light. As a result, the polarization angle of the reflected light 1203 is shifted by an angle 2θ from the direction of the s-polarized light as earlier described in the fundamental principle of the present invention. The reflected light is reflected by the beam splitter 1104, passed through the analyzer 1108, and then supplied to the detector 1109. When the analyzer 1108 and the detector 1109 detect the polarization angle 2θ of the reflected light, it is possible to reproduce the multilevel-modulated and recorded angle θ. Here, as the detector 1109, there may be used a CCD (charge-coupled device) and a photodiode.

As described above, since the reproducing method and the reproducing apparatus according to the present invention can detect the recorded angle θ by the angle 2θ that is twice as large as the recorded angle, it becomes possible to decode the recorded multilevel-modulated value. Since the dynamic range in the recording is 90 degrees, a dynamic range that can be used for reproduction is as large as 180 degrees. Moreover, the intensity of the reflected light is constant regardless of the gradation value, and the photodetector is able to set an S/N ratio to be high in accordance with the light amount. Furthermore, since information in the recording medium is recorded using an amount of light greater than the saturated light amount as earlier described, the recorded angle may be stably reproduced independently of the fluctuation of the reproducing or recording light intensity. Therefore, according to the reproducing method and apparatus of the present invention, information may be reproduced stably at a high S/N ratio independently of the gradation value. However, light amounts less than the saturation light amount can be used to induce a refractive index change in the recording medium to thereby form an optical element in the medium that substantially acts optically as a half-wave plate, a quarter-wave plate or other optical element that alters a polarization angle of reproducing light.

The optical recording medium 1106 according to the present invention is preferably a disk-like optical recording medium. Therefore, by using a motor 1107, a plurality of data may be recorded at various positions in the circumferential direction of the recording medium 1106. Moreover, the whole of the recording and reproducing head 1110 is moved along the diameter direction relative to the optical recording medium 1106, whereby data may be recorded in such a manner that recording tracks of concentric-shape are formed in the optical recording medium 1106 as shown in FIG. 12.

As described above, the optical recording and reproducing apparatus according to this embodiment comprises a medium driving mechanism for rotating the disk-like optical recording medium 1106 and a head moving mechanism for moving the optical recording and reproducing head 1110 including the light source, the spatial optical modulator, the focusing optical system, the reproducing optical system, and the detection system along the diameter direction of the optical recording medium 1106. The optical recording medium 1106 may be incorporated within the optical recording and reproducing apparatus.

While the embodiment of the present invention shown in FIG. 12 is arranged so as to effect recording and reproduction simultaneously and/or sequentially, it may be modified to be exclusively used for recording or exclusively used for reproduction. When the apparatus according to this embodiment is modified to be exclusively used for recording, assemblies relating to the reflected light detection portion become unnecessary so that the beam splitter 1104, the analyzer 1108 and the detector 1109 are removed from the arrangement shown in FIG. 12. Thus, the recording head may be made smaller and lighter. Moreover, it becomes possible to manufacture an inexpensive apparatus as compared with the recording and reproducing apparatus. In order to provide an apparatus exclusively used for reproduction, the polarization rotary device 1103 necessary for recording is removed from the arrangement shown in FIG. 12. Thus, a reproducing head may be miniaturized and made lighter. Moreover, it becomes possible to manufacture an inexpensive apparatus as compared with the recording and reproducing apparatus.

Optical systems used in conventional CD-ROM and magneto-optical disk systems may be applied to the optical system shown in FIG. 12. Therefore, the minimum size of a recorded area in the medium 1106 can be made the same size as the conventional systems. However, the recording and reproducing apparatus of the present invention is able to increase a capacity, density and a speed by using multilevel recording. With respect to recording, the angular resolution of the polarization rotary device 1103 determines the recordable multi-value level, and up to data of 255 values (8 bits) possible at present. With respect to reproduction, a reproducing angle resolution of the detector determines the multi-value level of data that can be used. The magneto-optical disk is able to detect an angle of less than 1 degree. Since the present invention has a dynamic reproduction range of 180 degrees, if the same detector used in conventional magneto-optical disk systems is used in the invention it is possible to reproduce data of more than 200 values (approximately 8 bits). Therefore, considering a balance of recording and reproduction, recording and reproduction of more than 200 values (approximately 8 bits) is possible. Therefore, the recording and reproducing apparatus according to the present invention may achieve a storage capacity of about 100 CD-ROMs of binary type, and the read-out speed thereof can be as high as about 100 times the conventional read-out speed. Further, the write speed may be decreased to approximately a few ms order per pit. If recording greater than 200 values is executed during this period of time, then it becomes possible to make the recording speed one order of magnitude higher than conventional systems.

If the recording and reproducing apparatus according to the present invention is modified slightly, the recording and reproducing apparatus can read conventional CD-ROMs or magneto-optical disks. In the case of CD-ROMs, the polarization angle of the reflected light is not changed, and only the intensity of the reflected light is changed. Since the reproducing light detection unit of the apparatus according to the present invention can also detect intensity, if the change in intensity of the light reproduced by the CD-ROM is determined in a binary fashion, reading of the CD-ROM is possible. Moreover, in the case of the magneto-optical disk, it is sufficient to detect the polarization angle of the reflected light. Since the apparatus according to the present invention has sufficient resolution to detect the very small polarization angle change in the magneto-optical disk, the apparatus is also able to read the magneto-optical disk.

With respect to the optical recording medium that is recorded by the recording and reproducing apparatus according to the present invention, the optical recording medium can be recorded in such a manner that the optical recording medium can be read by a magneto-optical disk reproducing apparatus. In the magneto-optical disk, a very small polarization angle change is recorded. Since the recording of the present invention has the fundamental principle for recording a very small polarization angle change and has a resolution equivalent to that of the magneto-optical disk, the optical recording medium according to the present invention can be recorded in such a manner that it may be read by a magneto-optical disk reproducing apparatus.

Figure 14:
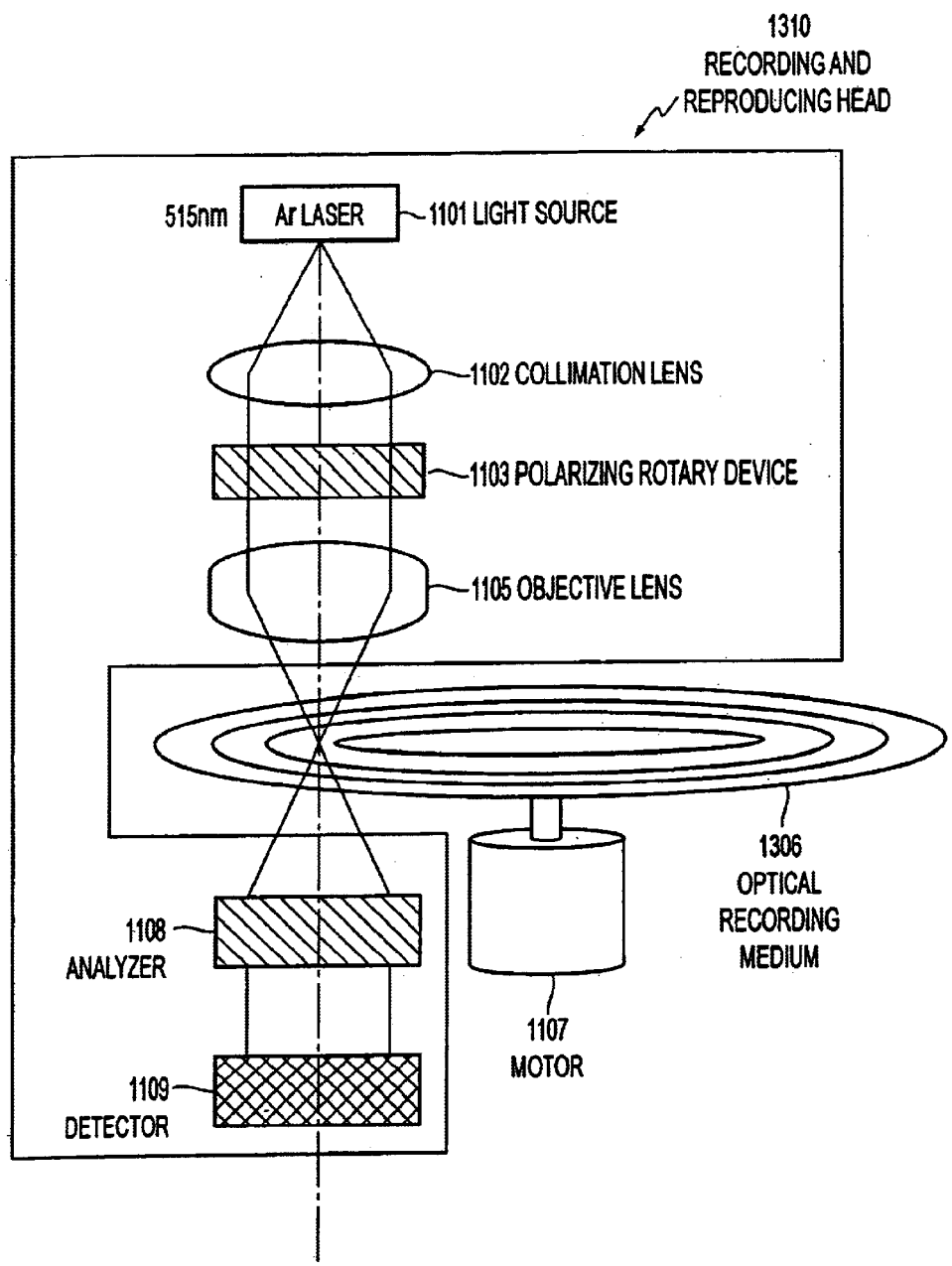
FIG. 14 is a diagram showing an optical recording and reproducing apparatus according to another embodiment of the present invention.

FIG. 14 is a diagram showing an optical recording and reproducing apparatus according to another embodiment of the present invention. This optical recording and reproducing apparatus uses a disk-like translucent optical recording medium 1306 of the structure shown in FIG. 6(A). In FIG. 14, the thickness d of the optical recording material on the optical recording medium 1306 will be described initially. Since translucent optical recording and reproducing are carried out, it is sufficient that the optical recording medium function as a half-wave plate. Accordingly, the thickness d is expressed by the following equation (8) through the modification of the equation (5):

$$d=(\lambda/2)/\Delta n \qquad (8)$$

As the optical recording material, material similar to that of the reflection type is preferably used. Also, an argon laser is preferably used as the light source 1101. When the measured $\Delta n=0.033$ and the wavelength 0.515 $\mu$m of the argon-ion laser are substituted into the equation (8), the thickness d is 7.8 $\mu$m. Accordingly, the thickness d of the optical recording material on the optical recording medium 1306 according to the present invention is 7.8 $\mu$m. Also, the polarized light of the laser beam is s-polarized. Here, the s-polarized light is directed in a direction parallel to the disk surface of the optical recording medium 1306.

With reference to FIG. 14, an information recording method will be described initially. The elements used in this apparatus are largely the same as that of the reflection type apparatus. A recording laser beam from the light source 1101 is collimated by the lens 1102 and then introduced into the polarization rotary device 1103. The polarization rotary device 1103 is able to change the polarization angle of the transmitted light from 0 to 90 degrees in response to a voltage supplied to the polarization rotary device 1103. Here, the polarization angle of the s-polarized light is set to 0 degrees, and the rotation is executed in the direction parallel to the disk surface of the optical recording medium 1306. The recording light passed through the polarization rotary device 1103 is introduced into the objective lens 1105. The objective lens 1105 focuses the recording light on the optical recording medium 1306. Thus, the photo-induced birefringence may be recorded on the optical recording medium 1306. At that time, by controlling the voltage applied to the polarization rotary device 1103, it is possible to change the polarization angle θ of the recording light from 0 to 90 degrees with respect to the reproducing light (s-polarized light). As a consequence, as shown in FIG. 13, an azimuth of a very small half-wave plate formed by the birefringence induced by recording light 1101 may be set to θ(0<θ<90) degrees. When information is recorded as multilevel-modulated values by using this controllable angle θ, it is possible to record information in a multilevel fashion.

A method of reproducing recorded information will be described next with reference to FIG. 14. Reproducing laser light from the light source 1101 is collimated by the lens 1102 as parallel light and then introduced into the polarization rotary device 1103. However, the light intensity is preferably considerably decreased as compared with that used in the recording so as not to destroy the recorded photo-induced anisotropy. Although the reproducing light is introduced into the polarization rotary device 1103, no voltage is applied to the polarization rotary device 1103 so that the passed light is s-polarized. Further, the reproducing light transmitted through the polarization rotary device 1103 is introduced into the objective lens 1105. The objective lens 1105 focuses the reproducing light on the optical recording medium 1306. Thereafter, the reproducing light is transmitted through a recorded area on the medium 1306, i.e. a very small half-wave plate and then output from the lower surface of the optical recording medium 1306. The reproducing light 1202 is s-polarized as shown in FIG. 13, and the direction of the recorded very small quarter-wave plate is shifted by the angle θ from the axis of the s-polarized light. As a result, the polarization angle of the reflected light 1203 is shifted by an angle 2θ from the direction of the s-polarized light as earlier described in the fundamental principle of the present invention. This light is transmitted through the analyzer 1108 and is supplied to the detector 1109. When the analyzer 1108 and the detector 1109 detect the polarization angle 2θ of the transmitted light, it is possible to reproduce the multilevel-modulated and recorded angle θ. As described above, the translucent type reproducing method and the reproducing apparatus can detect the recorded angle θ by the angle 2θ that is twice as large as the recorded angle.

Similar to the embodiment shown in FIG. 12, the translucent-type recording and reproducing apparatus shown in FIG. 14 is able to record and reproduce information in the circumferential direction and in the diameter direction of the optical recording medium 1306. To this end, the recording and reproducing apparatus according to this embodiment comprises a medium driving mechanism for rotating the disk-like optical recording medium 1306 and a head moving mechanism for moving the optical recording and reproducing head 1310 including the light source, the spatial optical modulator, the focusing optical system, the reproducing optical system, and the detection system, in the diameter direction of the optical recording medium 1306. The optical recording medium 1306 may be incorporated within the optical recording and reproducing apparatus.

While the embodiment of the present invention shown in FIG. 14 is arranged so as to effect recording and the reproduction simultaneously and/or sequentially, it may be modified and exclusively used for recording or exclusively used for reproduction. When the apparatus according to this embodiment exclusively used for recording, assemblies relating to the transmitted light detection portion become unnecessary so that the analyzer 1108 and the detector 1109 are removed from the arrangement shown in FIG. 14. Also, in order to provide an apparatus exclusively-used for reproduction, the polarization rotary device 1103 necessary for recording is removed from the arrangement shown in FIG. 14. If the recording and reproducing apparatus is modified for exclusive use for either recording or reproducing, then a head may be miniaturized and made lighter. Moreover, it becomes possible to manufacture an inexpensive apparatus as compared with the recording and reproducing apparatus.

As set forth above, according to the recording medium of the present invention, the polarization angle of the recording light may be multilevel-modulated and recorded. When recorded information is reproduced, such recorded information may be reproduced under the condition that the polarization angle is twice that of the recorded angle so that a stable S/N ratio may be obtained upon reproduction. Further, with respect to the S/N ratio, by saturating the refractive index change of the recording material, it is possible to prevent the S/N ratio from being lowered due to the material variations or fluctuation in recording the light intensity. However, the refractive index change need not be saturated to reliably record information. Further, with respect to rewriting, erasing is not required, and hence a high-speed rewriting may be realized. If the recording medium is shaped as a disk, then it is possible to improve a storage capacity and a data transfer rate.

Further, if the optical recording material of the present invention is laminated in a multilayer fashion, then it becomes possible to further improve recording density. If a double-sided recording medium is provided by forming the optical recording material on a front and back surface of a reflection film, then it is possible to improve a recording density.

According to the optical recording and reproducing method and the apparatus of the present invention, the polarization angle θ of the recording light may be multilevel-modulated and recorded. Then, the recorded polarization angle θ is detected as a polarization angle change twice as large as the recorded polarization angle θ and multilevel-reproduced. Since the intensity of the reproducing light is constant independent of the value of the recorded polarization angle θ, there may be achieved a high S/N ratio in reproduction. By multilevel recording, recording and reproduction with high-density and at high speed is possible. If the optical recording medium is shaped as a disk-like optical recording medium, then it is possible to record and reproduce information along the circumferential direction and along the diameter direction of the disk.

In the recording and reproducing apparatus of the present invention, if a very small modification is made, then it is possible to reproduce (read) conventional CD-ROMs or magneto-optical disks. Furthermore, with respect to the optical recording medium that is recorded by the recording and reproducing apparatus of the present invention, the optical recording medium can be recorded in such a manner that it may be reproduced by the magneto-optical disk reproducing apparatus.

According to the present invention, it is possible to obtain an optical recording medium and optical recording and reproducing method and apparatus in which multilevel information may be recorded and reproduced with a high density and at a high S/N ratio.

Having described preferred embodiments of the invention with reference to the accompanying drawings, it is to be understood that the invention is not limited to the precise embodiments and that various changes and modifications could be effected therein by one skilled in the art without departing from the spirit or scope of the invention as defined in the appended claims.

What is claimed is:

1. An optical recording medium, comprising at least one optical recording layer, the optical recording layer including an optical recording material that changes a state of photo-induced birefringence in response to a recording light that is externally controlled from the optical recording medium to rotate a polarization angle of the recording light, a portion of the recording layer that changes a state of photo-induced birefringence substantially acting optically as a half-wave plate; and a substrate which sustains the optical recording layer;

wherein an azimuth of the half-wave plate within the optical recording medium is multilevel-modulated so that information is recorded on the optical recording medium by the recording light.

2. The optical recording medium as claimed in claim 1, wherein said optical recording layer substantially satisfies:

$\Delta n \cdot d = (m + \frac{1}{2}) \cdot \lambda$ where:

$\Delta n$ is a refractive index change induced by recording light, d is a thickness of the optical recording layer, λ is the wavelength of reproducing light and m is an integer.

3. The optical recording medium as claimed in claim 1, wherein the photo-induced birefringence is caused by a refractive index change Δn induced by recording light, and the refractive index change Δn is a saturated refractive index change value when a recording light irradiation amount is greater than a saturation light amount.

4. The optical recording medium as in claim 1, wherein said polymer or a liquid crystal polymer comprises a side chain that includes a group which is photo-isomerized.

5. The optical recording medium as claimed in claim 4, wherein said polymer or said liquid crystal polymer contains an azobenzene skeleton.

6. The optical recording medium as claimed in claim 4, wherein said polymer or liquid crystal polymer comprises at least one kind of monomer-polymer selected from a polyester group.

7. The optical recording medium as claimed in claim 1, wherein said optical recording layer comprises a polymer in which photoisomerized molecules are dispersed.

8. The optical recording medium as claimed in claim 7, wherein said polymer contains an azobenzene skeleton.

9. The optical recording medium as claimed in claim 7, wherein said polymer comprises at least one kind of monomer selected from polyesters.

10. The optical recording medium as claimed in claim 1, wherein said optical recording layer has a disk shape.

11. The optical recording medium of claim 1, wherein the optical recording material of the optical recording layer comprises at least one of a polymer and a liquid crystal polymer.

12. An optical recording medium comprising:

at least one optical recording layer including an optical recording material that changes a state of photo-induced birefringence in response to a recording light that is externally controlled from the optical recording medium to rotate a polarization angle of the recording light, a portion of the recording layer that changes a state of photo-induced birefringence substantially acting optically as a quarter-wave plate; and an optical reflection layer formed on one surface of said optical recording layer;

wherein an azimuth of the quarter-wave plate within the optical recording medium is multilevel-modulated so that information is recorded on the optical recording medium by the recording light.

13. The optical recording medium as claimed in claim 12, wherein said optical recording layer substantially satisfies:

$\Delta n \cdot d = (m + \frac{1}{4}) \cdot \lambda$ where:
- Δn is a refractive index change induced by recording light,
- d is a thickness of the optical recording layer,
- λ is a wavelength of reproducing light, and
- m is an integer.

14. The optical recording medium as claimed in claim 12, wherein the photo-induced birefringence is caused by a refractive index change Δn induced by recording light, and the refractive index change Δn is a saturated refractive index change value when a recording light irradiation amount is greater than a saturation light amount.

15. The optical recording medium as claimed in claim 12, wherein said optical recording material comprises that a polymer or a liquid crystal polymer in which a side chain includes a group that is photoisomerized.

16. The optical recording medium as claimed in claim 15, wherein said polymer or said liquid crystal polymer contains an azobenzene frame.

17. The optical recording medium as claimed in claim 15, wherein said polymer or said liquid crystal polymer comprises at least one kind of monomer-polymer selected from a polyester group.

18. The optical recording medium as claimed in claim 12, wherein said optical recording layer comprises a polymer in which photoisomerized molecules are dispersed.

19. The optical recording medium as claimed in claim 18, wherein said polymer contains an azobenzene frame.

20. The optical recording medium as claimed in claim 18, wherein said polymer comprises at least one kind of monomer-polymer selected from a polyester group.

21. The optical recording medium as claimed in claim 12, wherein said optical recording layer has a disk shape.

22. An optical recording method comprising:
- controlling a polarization angle of a recording light emitted from a light source, the recording light externally controlled from an optical recording medium to rotate the polarization angle of the recording light;
- illuminating the optical recording medium with said recording light; and
- forming an optical element on the optical recording medium by the illumination, that acts substantially as a half-wave plate, having an azimuth corresponding to a polarization angle on the optical recording medium;
- wherein the azimuth corresponding to a polarization angle on the optical recording medium is multilevel-modulated so that information is recorded on the optical recording medium by the recording light.

23. The optical recording method as claimed in claim 22, wherein said step of controlling said polarization angle comprises directing said recording light emitted from said light source to a polarization rotary device.

24. The optical recording method as claimed in claim 22, wherein said step of forming said optical element comprises rotating a disk-like optical recording medium and directing said recording light along a diameter direction of said optical recording medium.

25. The optical recording method as claimed in claim 22, wherein said optical element is formed in a position at least partially coextensive with an existing optical element in said optical recording medium.

26. An optical recording method comprising:
- controlling a polarization angle of a recording light emitted from a light source, the recording light externally controlled from an optical recording medium to rotate the polarization angle of the recording light;
- illuminating the optical recording medium with said recording light; and
- forming an optical element on the optical recording medium by the illumination, that acts substantially as a quarter-wave plate, having an azimuth corresponding to a polarization angle on the optical recording medium;
- wherein the azimuth corresponding to a polarization angle on the optical recording medium is multilevel-modulated so that information is recorded on the optical recording medium by the recording light.

27. The optical recording method as claimed in claim 26, wherein said step of controlling said polarization angle comprises directing said recording light emitted from said light source to a polarization rotary device.

28. The optical recording method as claimed in claim 26, wherein said step of forming said optical element comprises rotating a disk-like optical recording medium and directing said recording light along a diameter direction of said optical recording medium.

29. The optical recording method as claimed in claim 26, wherein said optical element is formed in a position at least partially coextensive with an existing optical element in said optical recording medium.

30. An optical recording apparatus comprising:
- a light source that generates recording light;
- a spatial optical modulator that controllably rotates a polarization angle of said recording light; and
- a focusing optical system that performs multilevel modulation of an azimuth of a half-wave plate or a quarter-wave plate within an optical recording layer within of an optical recording medium by directing the recording light obtained through the spatial optical modulator to the optical recording medium.

31. The optical recording apparatus as claimed in claim 30, wherein said spatial optical modulator controls a polarization angle of said recording light in response to recording information.

32. The optical recording apparatus as claimed in claim 30, wherein said spatial optical modulator is a polarization rotary device.

33. The optical recording apparatus as claimed in claim 30, further comprising:
- a medium driving mechanism that rotates said optical recording medium; and
- a head moving mechanism that moves an optical recording head including said light source, said spatial optical modulator, and said focusing optical system, in a diameter direction relative to said optical recording medium.

34. The optical recording apparatus as claimed in claim 30, further comprising said optical recording medium.

35. An optical recording medium, comprising an optical recording layer including an optical recording material that stores multilevel information using a light induced birefringence that acts optically as a half-wave plate, an orientation of an azimuth of birefringence formed by a recording light representing the multilevel information, the recording light externally controlled from the optical recording medium to rotate a polarization angle of the recording light; and
a substrate which sustains the optical recording layer;
wherein the azimuth of birefringence formed by the recording light is multilevel-modulated so that information is recorded on the optical recording medium by the recording light.

36. The optical recording medium as claimed in claim 35, wherein said optical recording layer has a disk shape.

37. The optical recording medium of claim 35, wherein the optical recording material of the optical recording layer comprises at least one of a polymer and a liquid crystal polymer.

38. An optical recording medium, comprising an optical recording layer including an optical recording material that stores multilevel information using a light induced birefringence that acts optically as a quarter-wave plate, an orientation of an azimuth of birefringence induced by controllably rotating a polarization angle of a recording light externally from the optical recording medium that represents the multilevel information; and a substrate which sustains the optical recording layer;

wherein the orientation of the azimuth of birefringence is multilevel-modulated so that information is recorded on the optical recording medium by the recording light.

39. The optical recording medium as claimed in claim 38, wherein said optical recording layer has a disk shape.

40. The optical recording medium of claim 38, wherein the optical recording material of the optical recording layer comprises at least one of a polymer and a liquid crystal polymer.

41. An optical reproducing method comprising:

radiating a reproducing light on an optical recording medium in which an azimuth of an optical element that acts substantially as a half-wave plate is multilevel recorded in response to a polarization angle of a recording light that is externally controlled from the optical recording medium to rotate the polarization angle of the recording light; and determining a polarization angle of the reproducing light transmitted by said optical element;

wherein the reproducing light is directed on the optical recording medium in which an azimuth of the half-wave plate within the optical recording medium has been multilevel-modulated so that recorded information can be reproduced.

42. The optical reproducing method as claimed in claim 41, wherein said reproducing light has a light intensity smaller than that of said recording light.

43. The optical reproducing method as claimed in claim 41, wherein said step of determining said polarization angle comprises of rotating said optical recording medium and said step of radiating comprises radiating said reproducing light along a diameter direction of said optical recording medium.

44. An optical reproducing method comprising:

radiating reproducing light on an optical recording medium in which an azimuth of an optical element that acts substantially as quarter-wave plate is multilevel-recorded in response to a polarization angle of a recording light that is externally controlled from the optical recording medium to rotate the polarization angle of the recording light; and determining a polarization angle reproducing light reflected from said optical element;

wherein the reproducing light is directed on the optical recording medium in which an azimuth of the quarter-wave plate within the optical recording medium has been multilevel-modulated so that recorded information can be reproduced.

45. The optical reproducing method as claimed in claim 44, wherein said reproducing light has a light intensity smaller than that of said recording light.

46. The optical reproducing method as claimed in claim 44, wherein said step of determining said polarization angle comprises rotating said disk-like optical recording medium and said step of radiating comprises radiating said reproducing light along a diameter direction of said optical recording medium.

47. An optical reproducing apparatus comprising:

a reproducing light optical system for transmitting reproducing light to an optical recording medium in which an azimuth of an optical element that acts substantially as a half-wave plate is multilevel recorded in response to a polarization angle of a recording light that is externally controlled from the optical recording medium to rotate the polarization angle of the recording light; and an analyzing unit that detects a polarization angle of reproducing light transmitted by said optical element;

wherein the reproducing light is directed on the optical recording medium in which an azimuth of the half-wave plate within the optical recording medium has been multilevel-modulated so that recorded information can be reproduced.

48. The optical reproducing apparatus as claimed in claim 47, further comprising:

a medium driving mechanism that rotates said optical recording medium; and a head moving mechanism that moves an optical reproducing head including said reproducing light optical system and said analyzing unit, along a diameter direction of said optical recording medium.

49. The optical reproducing apparatus as claimed in claim 47, further comprising said optical recording medium.

50. An optical reproducing apparatus comprising:

a reproducing light optical system for emitting reproducing light toward an optical recording medium in which an azimuth of an optical element that acts substantially as a quarter-wave plate is multilevel recorded in response to a polarization angle of a recording light that is externally controlled from the optical recording medium to rotate the polarization angle of the recording light; and an analyzing unit that detects a polarization angle of reproducing light reflected by an optical reflection layer and transmitted by said optical element;

wherein the reproducing light is directed on the optical recording medium in which an azimuth of the quarter-wave plate within the optical recording medium has been multilevel-modulated so that recorded information can be reproduced.

51. The optical reproducing apparatus as claimed in claim 50, further comprising:

a medium driving mechanism that rotates said optical recording medium;

a head moving mechanism that moves an optical reproducing head including said reproducing light optical system and said analyzing unit, along a diameter direction of said optical recording medium.

52. The optical reproducing apparatus as claimed in claim 50, further comprising said optical recording medium.

53. An optical recording and reproducing apparatus comprising:

a light source that generates a recording light;

a polarization rotary device that rotates a polarization angle of said recording light;

a focusing optical system that irradiates an optical recording medium with said recording light obtained from said polarization rotary device;

a reproducing light optical system that irradiates said optical recording medium with reproducing light; and an analyzing unit that detects a polarization angle of reproducing light acted on by said optical recording medium;

wherein the reproducing light is directed onto the optical recording medium after an azimuth of a half-wave plate or a quarter-wave plate within the optical recording medium has been multilevel-modulated so that recorded information can be reproduced.

54. A method for optically recording and reproducing information, comprising:

controlling a polarization angle of a recording light emitted from a light source, the recording light controlled externally from an optical recording medium to rotate the polarization angle of the recording light;

illuminating the optical recording medium with said recording light;

forming an optical element on the optical recording medium by the illumination having an azimuth corresponding to a polarization angle on the optical recording medium;

radiating reproducing light on the optical recording medium; and determining a polarization angle of reproducing light acted on by said optical element;

wherein the reproducing light is radiated onto the optical recording medium after the azimuth of a half-wave plate or a quarter-wave plate within the optical recording element has been multilevel-modulated so that recorded information can be reproduced.

55. A device for optically recording and reproducing information, comprising:

controlling means for controlling a polarization angle of a recording light emitted from a light source, the recording light controlled externally from an optical recording medium to rotate the polarization angle of the recording light;

forming means for forming an optical element on the optical recording medium by the illumination having an azimuth corresponding to a polarization angle on the optical recording medium;

illumination means for radiating reproducing light on the optical recording medium; and determining means for determining a polarization angle of reproducing light acted on by said optical element;

wherein the reproducing light is directed onto the optical recording medium after the azimuth corresponding to the polarization angle on a half-wave plate or a quarter-wave plate within the optical element has been multilevel-modulated so that recorded information can be reproduced.

56. An optical recording medium, comprising an optical recording layer in which an optical element is formed by a recording light that is externally controlled from the optical recording medium to rotate a polarization angle of the recording light, the optical element having an azimuth of birefringence and acting on reproducing light to adjust a polarization angle of the reproducing light by an amount greater than a difference between a polarization angle of the recording light used to form the optical element and a polarization angle of the reproducing light before the reproducing light is acted on by the optical element; and a substrate which sustains the optical recording layer;

wherein the reproducing light is directed onto the optical recording medium after the azimuth of birefringence of the optical element has been multilevel-modulated so that recorded information can be reproduced.

57. The optical recording medium of claim 56, wherein the optical recording layer comprises at least one of a polymer and a liquid crystal polymer.

* * * * *